United States Patent
Weise et al.

(10) Patent No.: US 6,979,783 B2
(45) Date of Patent: Dec. 27, 2005

(54) HIGH VOLUME, HIGH UTILITY JUNCTION BOX

(76) Inventors: Gary K. Weise, 1700 Barcelona Cir., Placentia, CA (US) 92870; Richard J. Kesl, 1700 Barcelona Cir., Placentia, CA (US) 92870

( * ) Notice: Subject to any disclaimer, the term of this patent is extended or adjusted under 35 U.S.C. 154(b) by 260 days.

(21) Appl. No.: 10/004,129

(22) Filed: Nov. 1, 2001

(65) Prior Publication Data

US 2003/0079894 A1 May 1, 2003

(51) Int. Cl.$^7$ ................................................ H01M 9/02
(52) U.S. Cl. .......................... 174/58; 174/63; 174/135; 220/4.02
(58) Field of Search .............................. 174/50, 58, 63, 174/135; 220/4.02, 3.2; 439/535; 248/906

(56) References Cited

U.S. PATENT DOCUMENTS

| | | | | |
|---|---|---|---|---|
| 2,393,581 A | * | 1/1946 | Wentworth | 220/3.3 |
| 2,959,633 A | * | 11/1960 | Palmer et al. | 174/50 |
| 4,151,363 A | * | 4/1979 | Nichols | 174/65 R |
| 6,423,897 B1 | * | 7/2002 | Roesch et al. | 174/50 |

FOREIGN PATENT DOCUMENTS

| | | | | |
|---|---|---|---|---|
| EP | 1 156 566 A2 | * | 11/2001 | H02G/3/08 |
| WO | WO 97/30499 | * | 8/1997 | H02G/3/06 |

* cited by examiner

Primary Examiner—Dhiru R. Patel
(74) Attorney, Agent, or Firm—Terry L. Miller

(57) ABSTRACT

A high-volume, high-utility, non-conductive electrical junction box includes a back wall and four side walls in rectangular array extending from the back wall, with each side wall being jointed to the back wall and to the two adjacent side walls in order to both define an opening to the junction box, and to substantially enclose a volume therewithin. Inside of the junction box, electrical wiring and devices may be safely installed. The junction box includes internal mounting lugs that extend from the opening of the junction box toward but short of the back wall, and which thus provide an improved volume within a junction box of a standard size. Additionally, a multitude of conduit sockets may be attached to the junction box, and mutually lock to the walls of the junction box by use of a specialized multiple-engagement nut member. An alternative embodiment of the junction box provides for conduit socket insert members to be received into insert recesses defined on the box walls, and to there receive end portions of respective electrical conduits joining with the junction box. Plural junction boxes may be mutually interconnected.

49 Claims, 11 Drawing Sheets

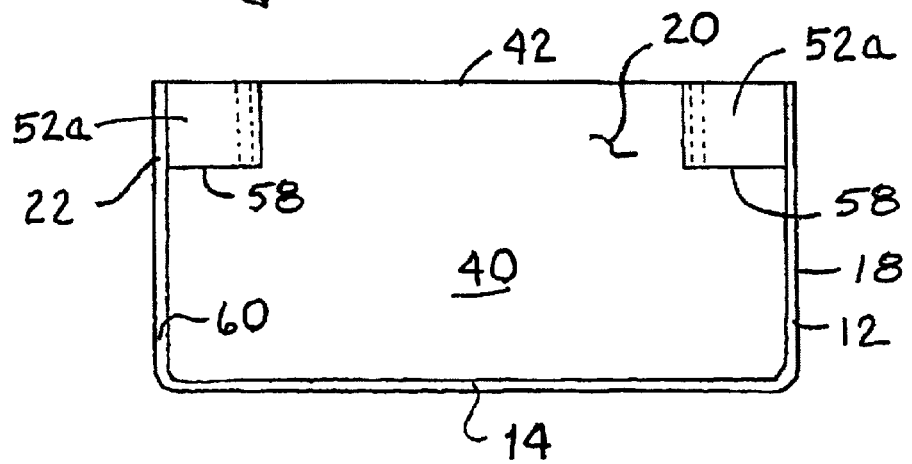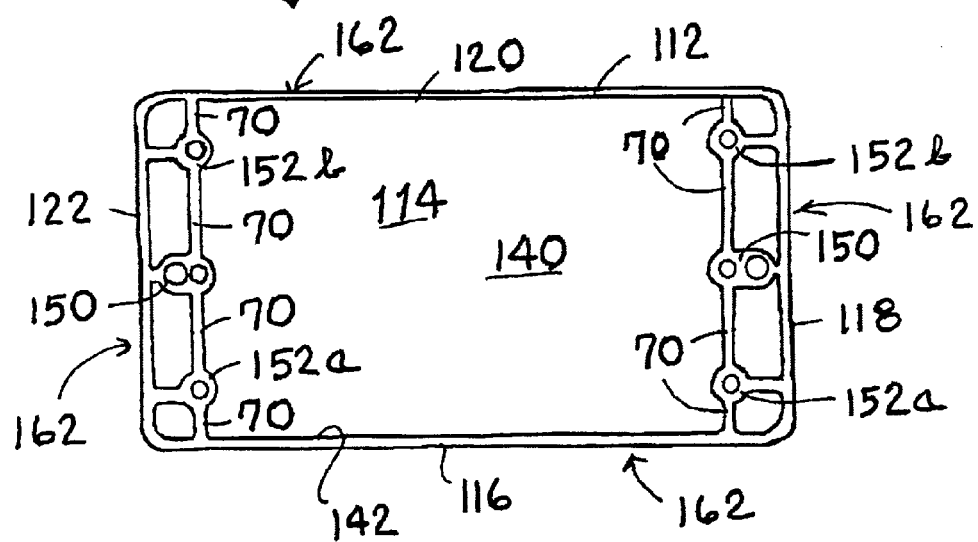

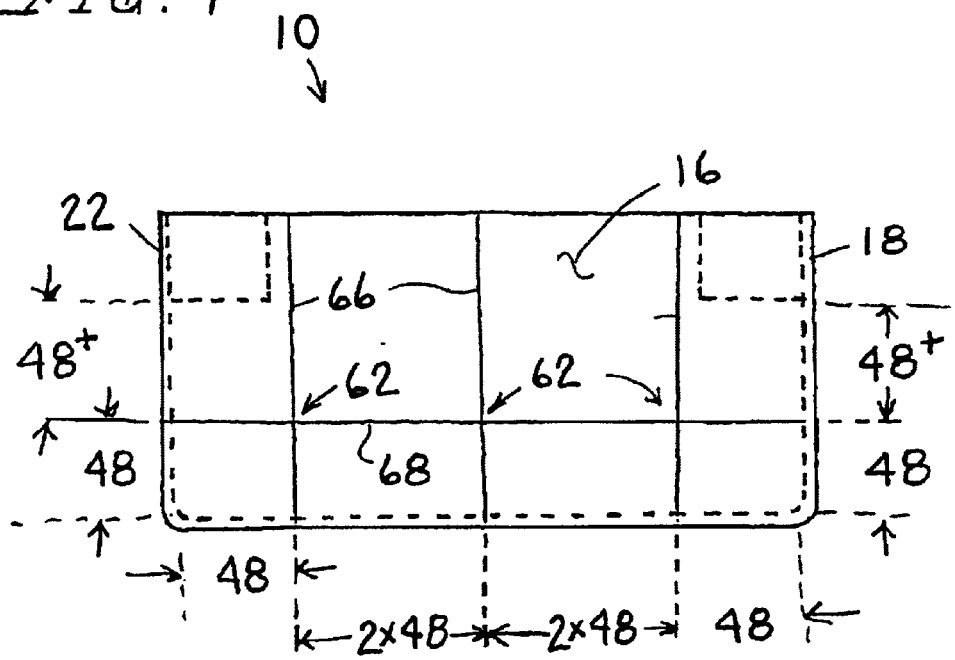
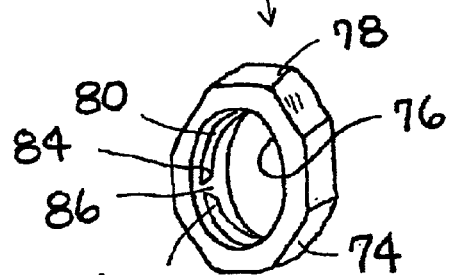
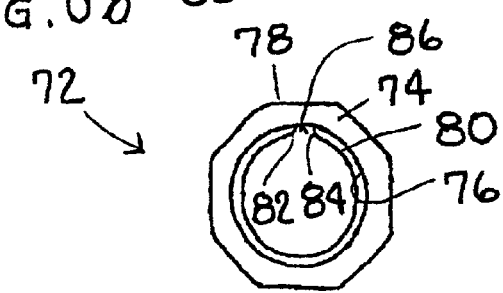

Fig.12
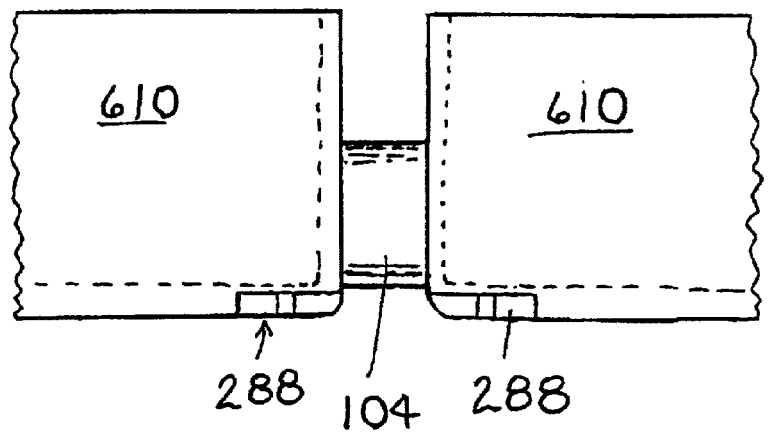
Fig.13
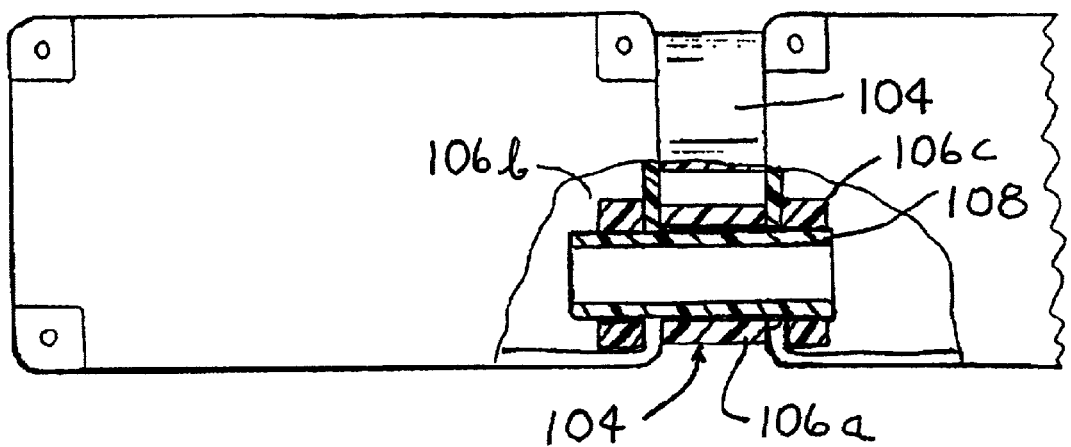
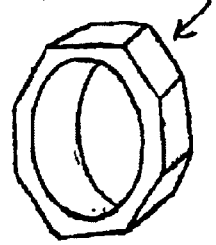
Fig.14A
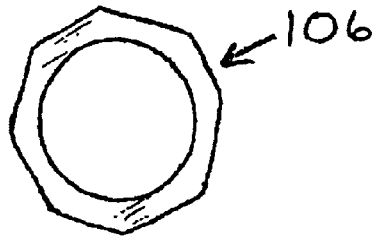
Fig.14b

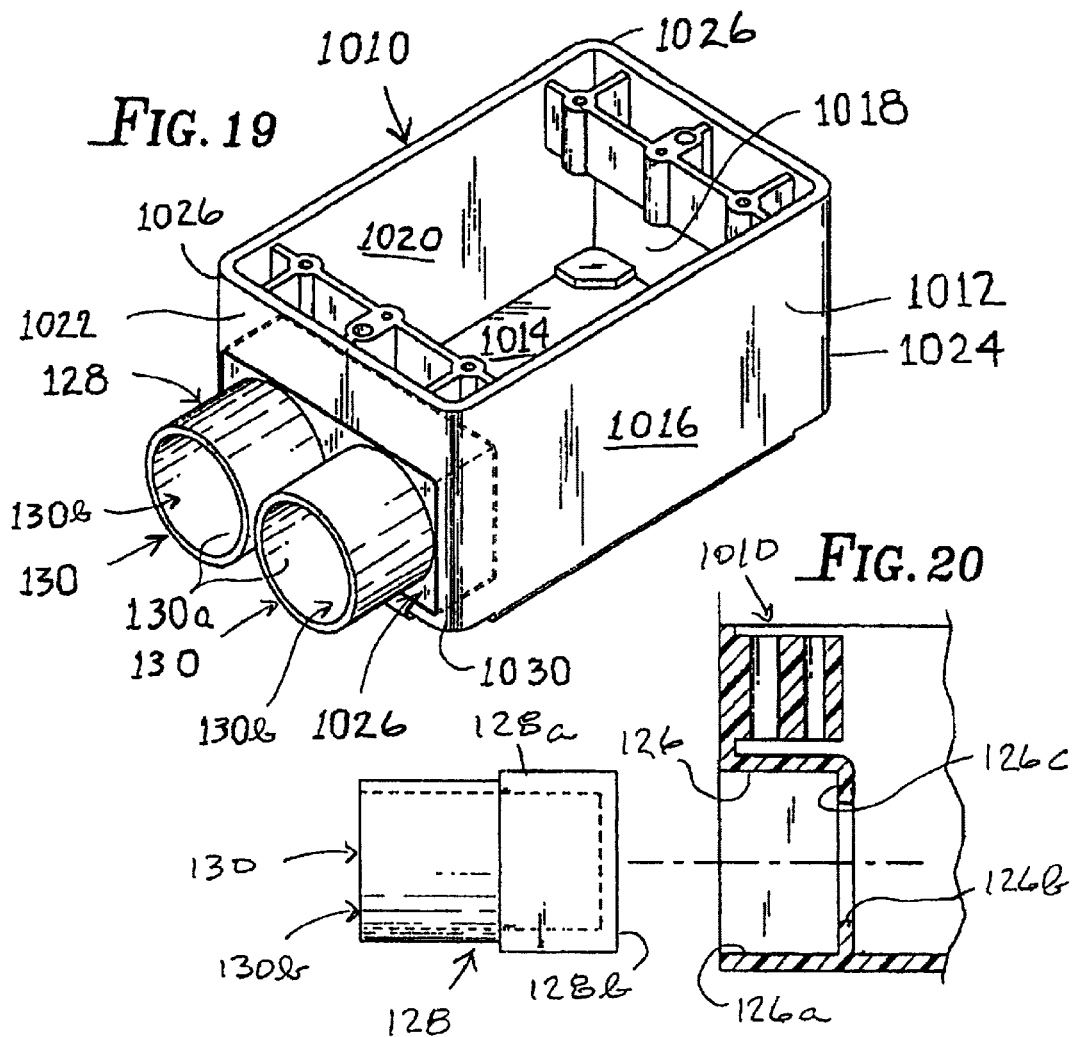
Fig. 19
Fig. 20
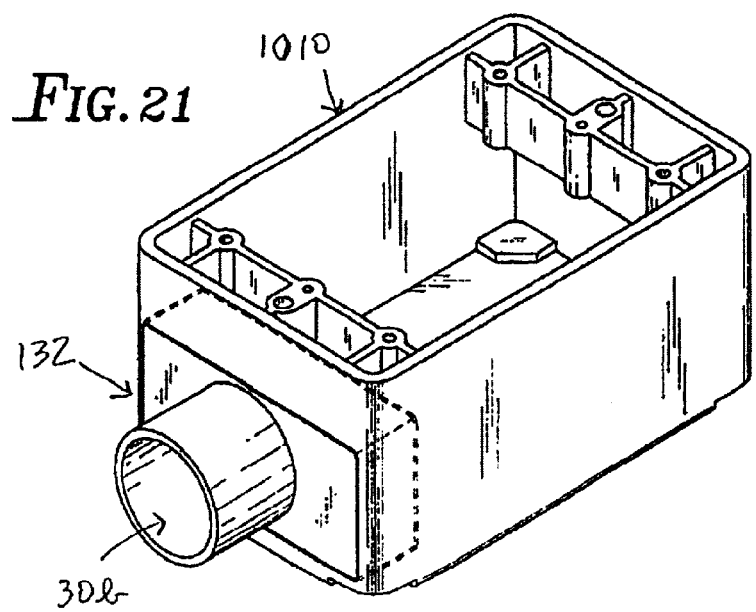
Fig. 21

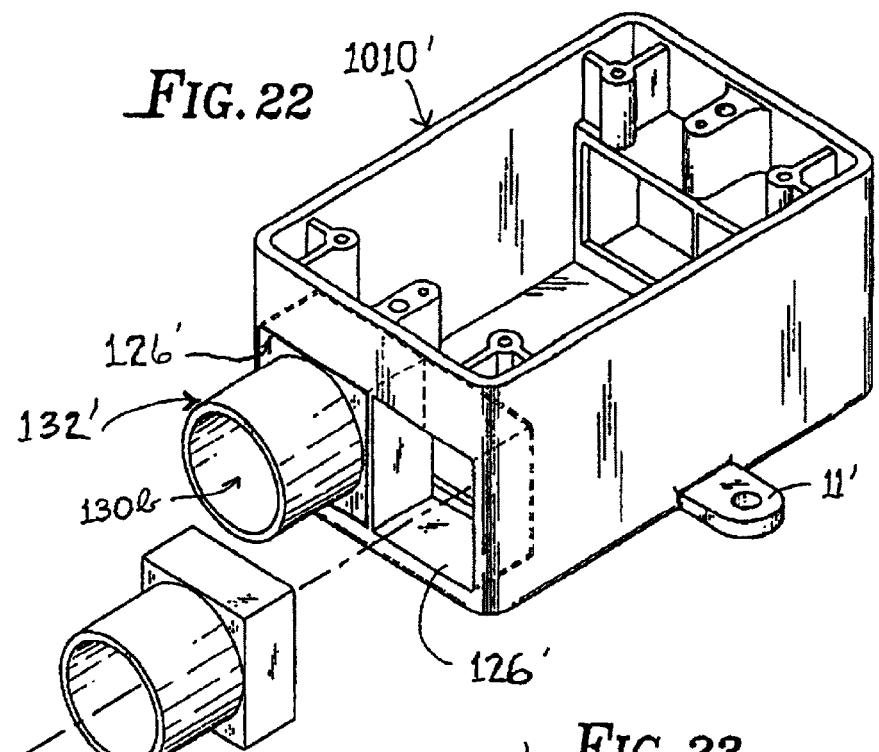
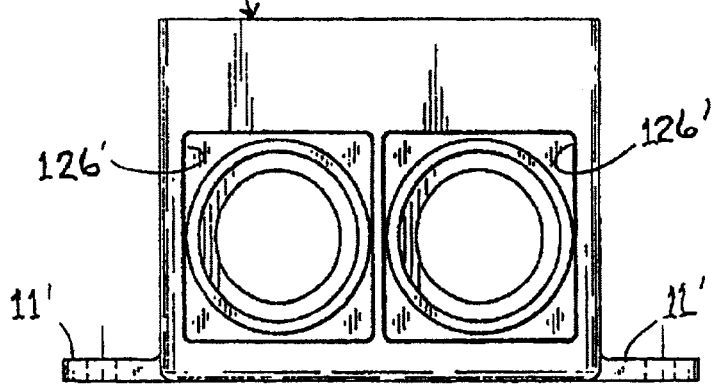
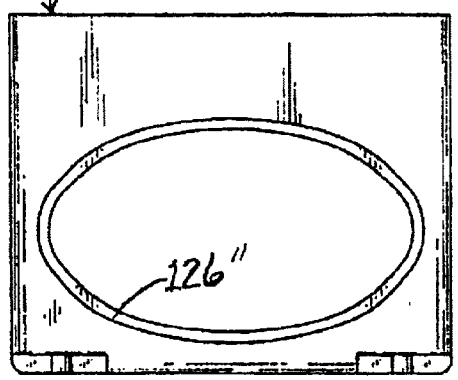
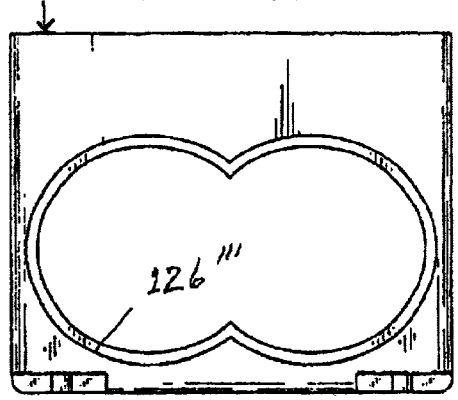

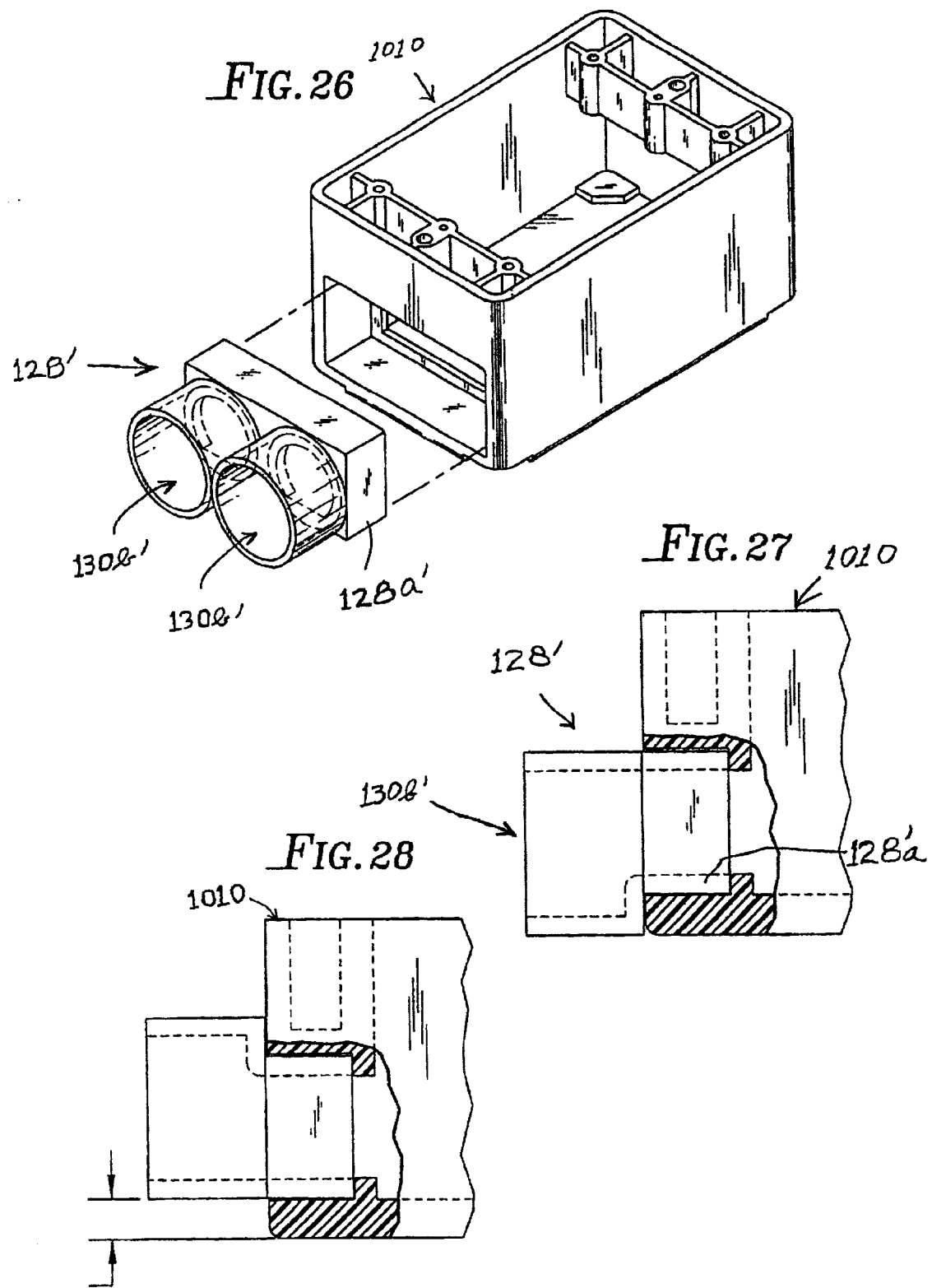

HIGH VOLUME, HIGH UTILITY JUNCTION BOX

BACKGROUND OF THE INVENTION

1. Field of the Invention

This invention is in the field of protective enclosures for electrical wiring. More particularly, this invention relates to a non-conductive protective enclosure for electrical wiring and related electrical components, which enclosure is of a size and configuration generally recognized in the trade as a junction box. Junction boxes are generally manufactured and supplied to the trade in industry-standard sizes and configurations. Some conventional junction boxes are made entirely or partially of conductive metallic material, but increasingly the electrical trade, and especially some particular applications such as electrical wiring in wet environments, call for junction boxes that are formed entirely non-conductive materials. Generally, electrical wiring terminations and electrical components are installed within such junction boxes in both residential and industrial environments. Typically, such electrical components and wiring terminations must be installed into and attached to a junction box so as to provide proper spacing between components, to provide environmental protection to the wiring terminations and components, and to prevent inadvertent contact with the wiring and components, for example, by people or animals. An important consideration is that a junction box be as spacious inside as is practicable for a particular size class in order to provide adequate room for the wiring terminations, and also be very flexible in the methods allowed for routing wires and conduits to and from the junction box.

2. Related Technology

Over the years there have been many types of electrical junction boxes developed, some for specialized usage and others for more generalized purposes, often with a view to both low cost of manufacture and to economy of use. The main purposes of such junction boxes have been to provide environmental protection for wiring terminations and electrical components installed in the boxes, while also preventing inadvertent contact by humans and animals with this wiring and electrical components.

Junction boxes have been designed in many and varying shapes and sizes, but have these above-described conventional considerations and functions in common. Many junction boxes are made to industry standard or to trade standard sizes. Earlier, junction boxes were generally constructed of metal and had only pre-formed knockouts for the attachment of conduits. When the electrician or installer found it necessary to have a hole for wire or conduit access to a junction box, this installer used a tool, such as either a punch or screwdriver, to remove a pre-formed knockout.

More recently, junction boxes have been constructed of plastics, or a mix of metals and plastics, and provide a wide variety of configurations for standard and for specialized uses. Conventional junction boxes which may be relevant to this invention include those set out in the following United States patents:

U.S. Pat. No. 5,169,013, issued Dec. 8, 1992, to Albert Lammens, Jr.;

U.S. Pat. No. 5,216,203, issued Jun. 1, 1993, to Edward E. Gower;

U.S. Pat. No. 5,352,850, issued Oct. 4, 1994, to Trevor W. Norris;

U.S. Pat. No. 5,541,363, issued Jul. 30, 1996, to Gary K. Weise, et al. (a named coinventor on the present application);

U.S. Pat. No. 5,828,001, issued Oct. 27, 1998, to Jan J. Schilhiam;

U.S. Pat. No. 5,936,200, issued Aug. 10, 1999, to Mike K. Park; and

U.S. Pat. No. 5,942,726, issued Aug. 24, 1999, to Kenneth Reiker.

A significant disadvantage of conventional junction boxes results from their comparative inflexibility of configuration, installation, size expansion capability; and particularly with respect to inflexibility for routing and attachment of electrical conduits.

SUMMARY OF THE INVENTION

In view of the deficiencies of the conventional related technology, it is an object of this invention to overcome one or more of these deficiencies.

This invention provides a molded non-conductive plastic junction box that has an interior volume which is larger than that of conventional junction boxes of the same exterior size. The present inventive junction box has a back wall and four contiguous side walls, each joined both to the back wall and to it's two contiguous side walls. The side walls are arranged in spaced apart opposite pairs and each side wall terminates at an end edge in a common plain with the other side walls to cooperatively define an opening into the box. This opening is used to insert components and wiring into the box and may be overlaid with a cover plate to provide a dry, non-corrosive, and economical enclosure.

The junction box includes mounting lugs adjacent to this opening for securing a cover plate to the box as well as for securing at least one electrical component inside the box. These mounting lugs extend from the plane of the junction box opening toward but short of the back wall of the box in order to provide increased interior volume for the junction box. Also, the wall portion of the junction box inwardly of the termination of these mounting lugs (i.e., toward the back wall of the box) provides additional wall space to which conduit sockets may be mounted, if desired.

Further, in order to provide a greater degree of utility for the present inventive junction box, it is provided with the back wall and side walls having no pre-fabricated openings (i.e., holes or knock-outs) though which to connect conduit sockets or thread wire. This absence of pre-formed conduit or wire openings allows the electrician or installer the greatest possible degree of freedom and flexibility with respect to how the junction box is to be installed. It is left up to the installer to drill such openings wherever they are needed for each individual instance of use of the junction box. In order to assist in this task, the junction box includes drilling indicia which are an assistance to accomplishing the installation of the maximum number of conduit sockets on each wall of the junction box. Of course, when a particular installation calls for creativity, the installer can put openings and conduit junctions anywhere on the box that is necessary.

Still further, the junction box includes special thin-wall securing nuts with which the installer can secure conduit sockets at desired locations. Especially when a large number of such conduit sockets are desired at an end wall or side wall of the junction box, these thin wall securing nuts will allow the conduit sockets to be nested together in the closest possible proximity to one another.

Additionally, these special thin-wall securing nuts are most preferably formed by injection molding, and include a nut body defining a through bore. Within this through bore of the nut body the nut defines only a single thread, which extends circumferentially through substantially 360°, but which also stops just short of a full 360° extent. That is, the single thread of the nut extends almost, but not quite a full turn within the nut body. As a result, the nut can be injection molded with inexpensive tooling that does not require use of a rotary core which unthreads from within the nut after molding. Those ordinarily skilled in the pertinent arts will recognize the manufacturing advantages flowing from this inventive design of nut.

Further to the above, an unthreaded version of this nut body is provided with which an installer or electrician may make a spacer of variable thickness in order to gang several junction boxes together, uniquely using connecting conduits between the junction boxes along with such variable spacers, as the structure connecting the ganged junction boxes, while also providing for the routing of electrical wiring among the ganged junction boxes.

Additionally, this present junction box according to one embodiment provides a uniquely flexible mounting structure for the junction box. By use of this flexible (or variable) mounting structure, the junction box may be mounted in a great variety of ways and combinations according to the requirements of particular installations.

The above-described flexible mounting structure makes use of a "common" mounting component, which is joined to the main body of the junction box in a variety of positions as the installer or electrician prefers.

Further to the above, this invention provides a unique conduit union which allows the junction box to be mounted to a mounting surface engaging the outside surface of the back wall of the junction box, while conduits attached to conduit sockets of the junction box are relieved from excessive stress by a "variable stack up" feature of the conduit union.

Still further to the above, alternative embodiments of the present inventive junction box include a unique insert member, which is receivable into an insert recess of the junction box, and which insert member defines one or more conduit sockets at which conduits may be coupled to the junction box.

Other objects, features, and advantages of the present invention will be apparent to those skilled in the art from a consideration of the following detailed description of two exemplary preferred embodiments of the inventive junction box, when taken in conjunction with the appended drawing Figures. In these appended drawing Figures, features which are the same or which are analogous in structure or function are indicated by the same reference numeral throughout the several views.

BRIEF DESCRIPTION OF THE DRAWINGS FIGURES

FIG. 1 is a perspective view of a junction box embodying the present invention with a pair of adjacent conduit sockets installed;

FIG. 2 provides an inside end view, partly in cross section, of the junction box seen in FIG. 1;

FIG. 3 provides a side elevation view, partly in cross section, of the junction box seen in FIGS. 1 and 2, but without the conduit sockets installed;

FIG. 4 is a plan view of an alternative embodiment of a junction box embodying the present invention;

FIG. 7 is an exterior side elevation view of the junction box seen in FIG. 6, and is also seen prior to formation of holes for conduit sockets, and without the conduit sockets themselves;

FIG. 8a is a perspective view of the special nut that is used (as is seen in FIGS. 2 and 5) to secure a standard conduit socket to the junction box according to this invention;

FIG. 8b is an axial view of a special nut member that is seen in FIG. 8a;

Figure 9:
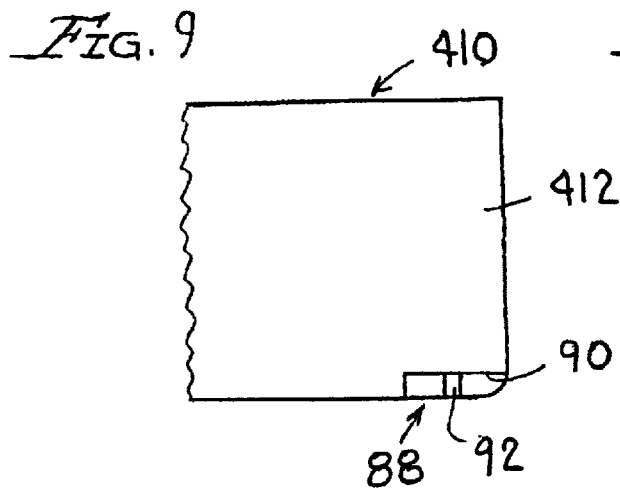
Figure 10:
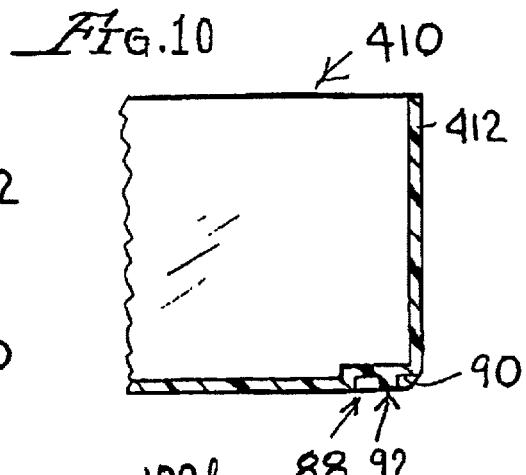
Figure 11:
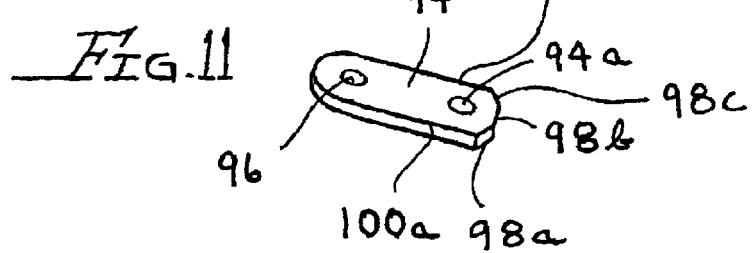
Figure 15:
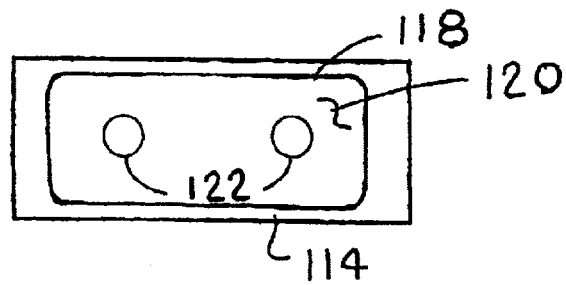
Figure 16:
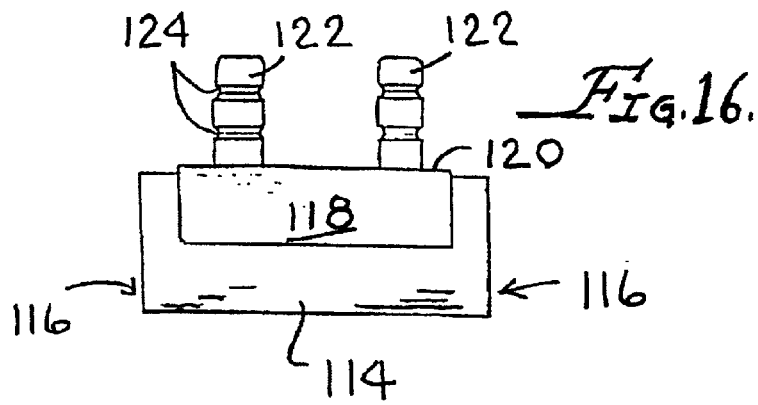
Figure 17:
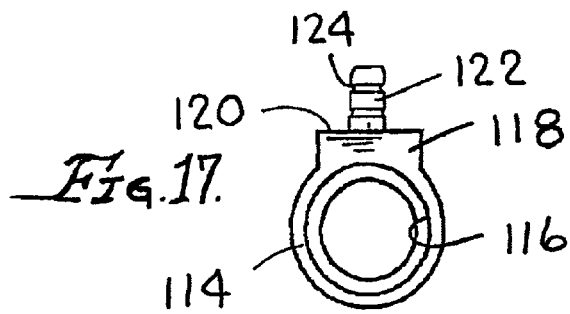
Figure 18:
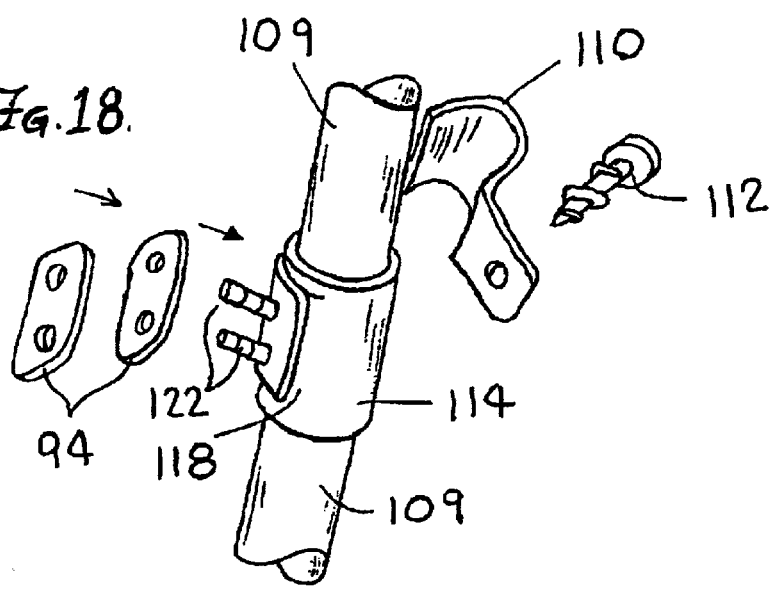
Figure 29:
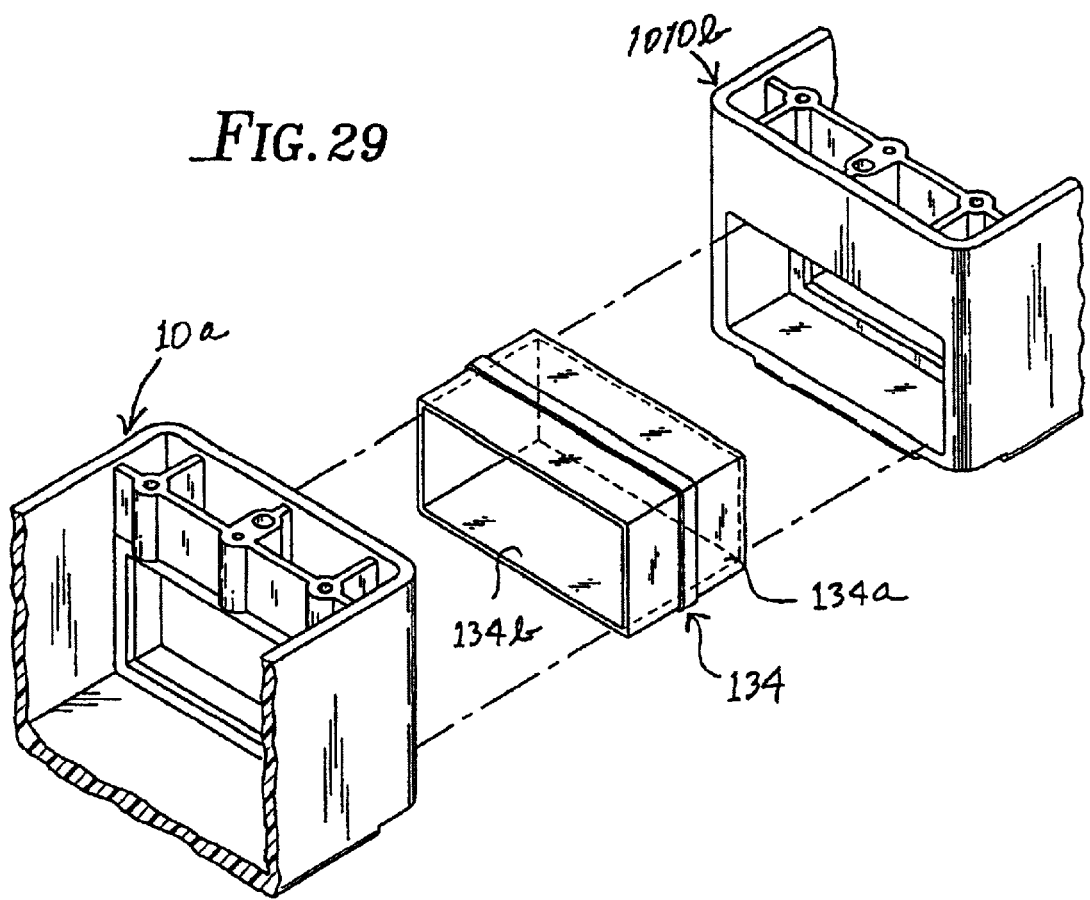
Figure 30:
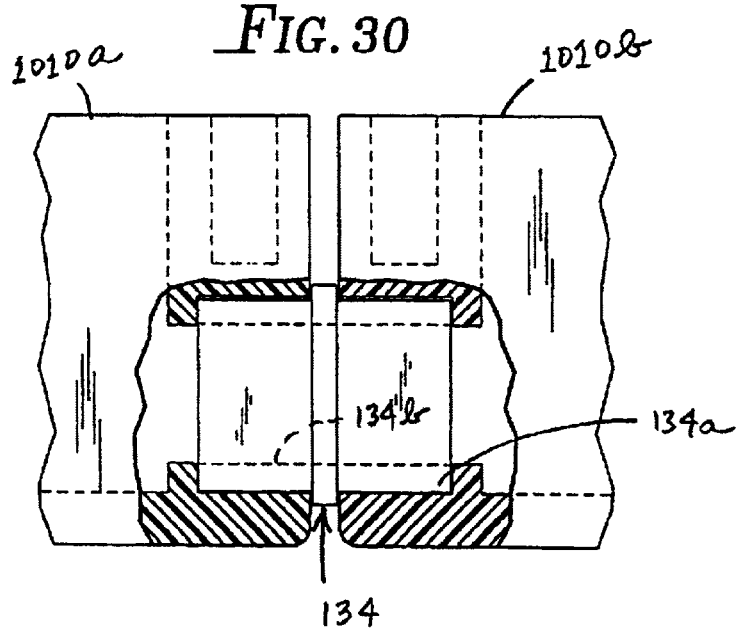

FIG. 9 provides a fragmentary side elevation view of the junction box seen in FIG. 7, and is taken at an side corner of the junction box;

FIG. 10 provides a fragmentary cross sectional view similar to the view of FIG. 9;

FIG. 11 is a perspective of the flexible mounting tab portion of the junction box of FIGS. 7, and 9–11;

FIGS. 12 and 13, respectively, are fragmentary side elevation and rear elevation views, of a pair of junction boxes joined structurally by a pair of conduit nipples and a pair of unique spacers according to the present invention;

FIGS. 14a and 14b, respectively, provide a perspective view and an axial view of the unique spacer member illustrated in FIGS. 12 and 13;

FIGS. 15 and 16, respectively, provide a plan view and a side elevation view of a novel conduit coupling according to the present invention;

FIG. 17 is an axial end view of the conduit coupling seen in FIGS. 15 and 16; and FIG. 18 provides an exploded fragmentary assembly view of a conduit coupling according to FIGS. 15–17, being used to join the adjacent ends of a pair of conduits, and to also relieve side stress on the conduits from a conduit clamp and securing screw;

FIG. 19 provides a perspective view of yet another alternative embodiment of a junction box embodying the present invention, and includes a conduit socket insert member having a pair of conduit sockets;

FIG. 20 is a fragmentary view, partially in cross section, of the junction box seen in FIG. 18, and having the conduit socket insert member of the junction box shown in spaced isolation view and juxtaposed to a insert recess of the junction box;

FIG. 21 provides a perspective view of the alternative embodiment of junction box seen in FIG. 19, but in this view includes a conduit socket insert member having a single conduit socket;

FIG. 22 provides a perspective view of still another alternative embodiment of a junction box embodying the present invention, which junction box is similar in many respects to the one seen in FIG. 19, and which includes a pair of single-conduit socket insert members each have only a single conduit socket;

FIG. 23 is a fragmentary view, partially in cross section, of the junction box seen in FIG. 22, and having the pair of single-conduit socket insert members received into a corresponding pair of insert recesses of the junction box;

FIGS. 24 and 25 each show additional alternative embodiments of a junction box embodying the present invention, and in which respective insert recesses for receiving conduit socket insert members have an oval shape (FIG. 24), and a bicameral radiused or semicircular shape;

FIG. 26 provides a perspective view of yet another alternative embodiment of a junction box embodying the present invention, which junction box is similar in many respects to the one seen in FIG. 19, but which includes a double-conduit socket insert member have a pair of conduit sockets;

FIG. 27 is a fragmentary view, partially in cross secction, of the junction box seen in FIG. 26;

FIG. 28 is a fragmentary view, partially in cross section, of the junction box seen in FIG. 26, but in this view has the double-conduit socket insert member received in a second orientation into the corresponding insert recess of the junction box; and FIGS. 29 and 30 respectively show a perspective view and a fragmentary cross sectional view of an alternative embodiment of an insert member for use with junction boxes embodying the present invention, and additional alternative embodiments of a junction box embodying the present invention, and which provides for joining together of two such junction boxes.

DETAILED DESCRIPTION OF EXEMPLARY PREFERRED EMBODIMENTS OF THE INVENTION

First Two Embodiments

Figure 1:
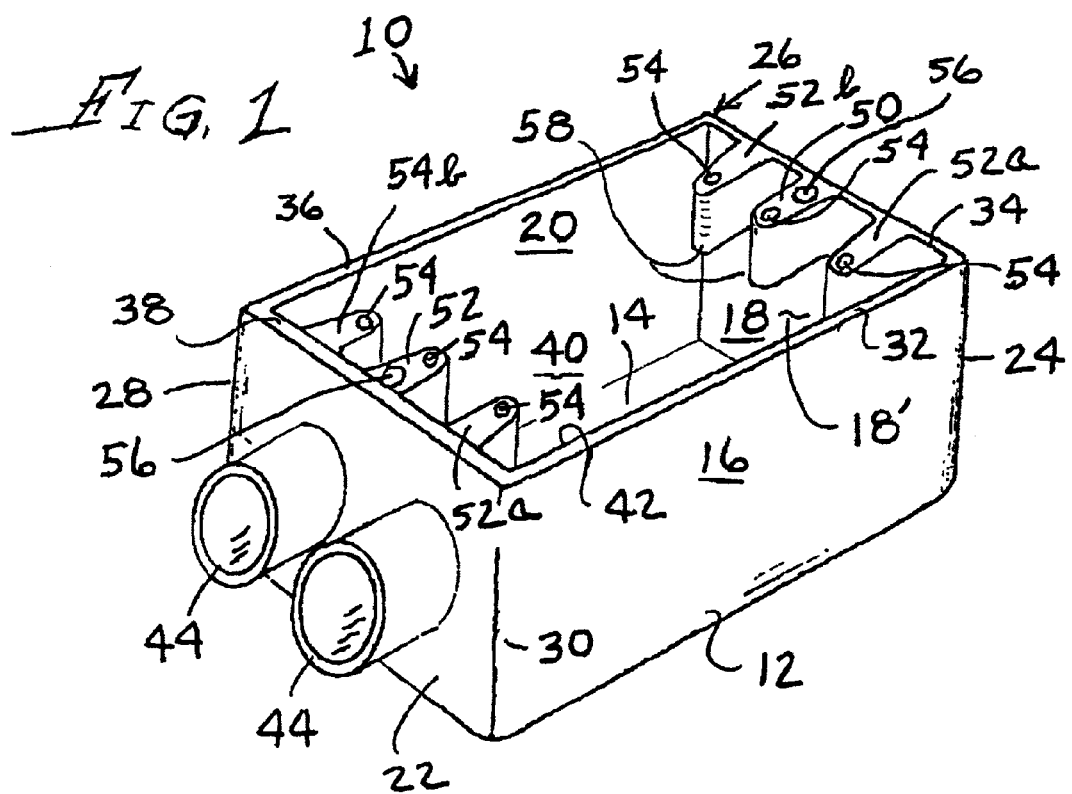

Referring in general to drawings appended to this application, it can be seen that this invention provides a high-volume, high-utility, non-conductive enclosure (i.e., a junction box) for the placement of electrical components and wiring. In FIG. 1 a junction box 10 embodying the present invention is seen. This junction box 10 includes a chambered prismatic body 12 formed of non-conductive plastic material. More particularly, the body 12 may preferably be injection molded of polyvinyl chloride (PVC), or of other thermoplastic or thermoset polymer materials known in the art.

The body 12 includes a back wall 14, and plural (i.e., at least four) contiguous walls 16, 18, 20, and 22 which are generally perpendicular to the back wall 14. The contiguous walls 16–22 are joined integrally to the back wall 14, and are each also integrally joined to each of the two adjacent ones of the plural walls 16–22. These walls 16–22 are arranged in opposing pairs of generally parallel walls, and the adjacent walls are integrally joined to one another to form corner junctions 24, 26, 28, and 30.

Further to the above, the walls 16–22 are arranged in opposing generally parallel pairs so that they form a pair of side walls 16, 20; and a pair of end walls 18, 22. Each of the walls 16–22 has a respective termination edge or end edge 32–38, which end edges are all substantially in a common plane. The walls 14–22 of the junction box 10 cooperatively bound a cavity 40, and also cooperatively define an opening 42 to this cavity 40 within junction box 10. The end edges 32–38 circumscribe this opening 42. In other words, the opening 40 provides access to the cavity 42 formed within the junction box 10 by the cooperation of the back wall 14 and the side walls 16–22.

As is seen in FIG. 1, the end wall 22 of the exemplary box 10 (i.e., in this particularly illustrated instance) has been prepared for (i.e., by the drilling of a pair of holes, as will be explained) and receives two conduit sockets 44. These conduit sockets themselves are or may be conventional, but it will be seen that the method and structure of their placement in and securement to the junction box 10 is not conventional. That is, viewing FIGS. 1 and 2 in conjunction, it is seen that the conduit sockets 44 are disposed on end wall 22 with an axial centerline point 44a of each socket (and with a point 44b midway between these centerline points 44a) dividing an interior end wall dimension 46 of the box 10 into four equal parts 48.

Figure 2:
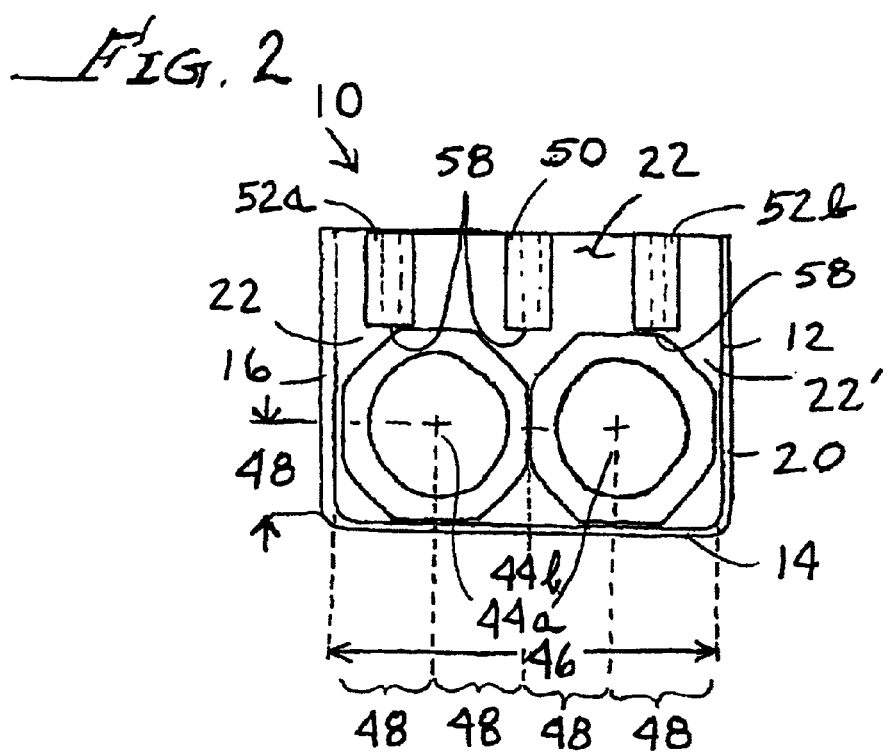

As is seen in FIG. 2, the end wall 22 of the junction box 10 has a sufficient interior side-to-side dimension 46 to receive at most two of the conduit sockets 44. However, in order for the end wall 22 (or end wall 18) to receive the maximum number of two conduit sockets 44, these conduit sockets must be positioned as is seen in FIG. 2. That is, the center-to-center dimension between the two conduit sockets 44 must be substantially twice the dimension 48, and the spacing from the centerline points 44a to the side walls 16 and 20 must also be substantially equal to the dimension 48. That is, the center-to-wall dimension between the axial center of conduit sockets 44 (i.e., at their centerline 44a) and the interior surface of the back wall 14, and between these conduit sockets and the interior surfaces of walls 16, 20 must also be substantially equal to the dimension 48. Additional explanation of this aspect of the junction box 10 is provided below. It will be seen that, if desired, the end walls 18 and 22 may receive only a single conduit socket 44, in which case the placement of the single conduit socket is up to the user's discretion, and is not particularly critical.

Turning now to consideration of FIGS. 1 and 2 in greater detail, it is seen that the junction box 10 also includes a plurality of inwardly extending mounting lugs. The use of these mounting lugs will be familiar to those ordinarily skilled in the pertinent arts. However, it is seen that these mounting lugs include a pair of center mounting lugs 50, 52 (one on each end wall 18, 22); and four side mounting lugs 50a, 50b, 52a, and 52b (two one each end wall 18, 22). Each of the mounting lugs 50–52b is individually cantilevered from a respective one of the end walls 18, 22, and is provided with a threaded screw hole 54. Those ordinarily skilled in the art will recognize the screw holes 54 as being usable for securing an electrical component within the cavity 40, or for securing a cover plate at the opening 42. Similarly, the center mounting lugs 50, 52 are each provided with a guide hole 56, which by receiving a guide pin on a standard ground fault interrupter allows such an interrupter to be installed within the junction box 10.

As is seen in FIGS. 1 and 2, the mounting lugs 50–52b each extend from substantially the level of the opening 42 (i.e., substantially coplanar with the end edges 32–38) inwardly of the box (i.e., inwardly of cavity 40) toward the back wall 14. However, all of the mounting lugs 50–52b stop short of the back wall 14. That is, each of the mounting lugs 50–52 defines a respective termination surface 58, which is disposed toward but spaced from the interior surface of back wall 14. That is, the termination surfaces 58 of mounting lugs 50–52b are all spaced away from back wall 14 by about the same dimension, both in order to provide an increased interior volume for the box 10 (i.e., for each particular exterior size of junction box which may be made using this present invention), and in order to provide the end walls 18, 22 with a portion 18', 22' (seen in FIGS. 1 and 2 in conjunction with one another) that is free of obstruction by the mounting lugs 50–52b. It is in these end wall portions 18' and 22' that conduit sockets may be installed, as is illustrated in FIG. 2. It will be appreciated that because the end walls 18 and 22 are blank (that is, without mounting holes for the conduit sockets) the holes must be drilled or otherwise formed by a user of the junction box 10 as part of the installation process. This allows the user to accomplish a unique level of flexibility of installation and utilization for the junction box 10.

Figure 6:
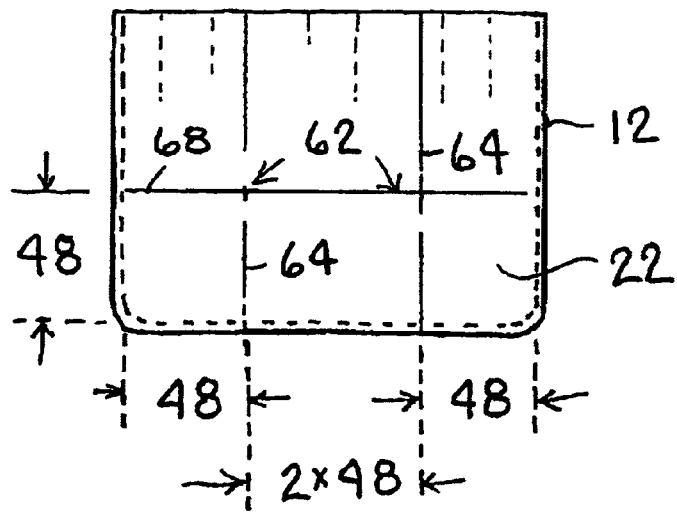
FIG. 6 is an exterior end elevation view of the junction box seen in FIGS. 4 and 5, and is seen prior to the formation of holes for conduit sockets, and without these conduit sockets.

In order to better appreciate how the conduit sockets 44 are mounted to any of the walls 14–22, attention now to FIG. 3 will show the inventive junction box during preparations to install these conduit sockets. It is seen that the junction box 10 has been prepared by the drilling of a pair of holes 60 (only one of which is seen in FIG. 3) into which the threaded stem portion of the standard conduit sockets is received. In order to assist the user of the junction box 10 in this drilling of holes 60 for conduit sockets 44, it is seen in FIGS. 1 and 2 that the end walls 18, 22 (and the side walls 16, 20 as well, as will be further explained) each carry outwardly disposed drilling indicia 62–68 (attention to FIGS. 6 and 7 is helpful at this time). These drilling indicia include a pair of parallel front-to-back lines 64 on the end walls 18, 22 of the box 10, and a set of three parallel front-to-back lines 66 on each side wall 16, 20. Each of these lines 64, 66 is spaced from the interior surface of the respective side or end wall by substantially the dimension 48, and each is spaced from the other line of the pair or trio by twice the dimension 48. The indicia 62 in this embodiment are each indicated in the Figures as being represented by the intersection of the lines 64, 66 and a circumscribing line 68 which circumscribes the box 10 at a level (i.e., distance from the back wall 14) which spaces this line from the inner surface of back wall 14 by a dimension substantially equal to dimension 48, and which also has substantially this same spacing from the surface 58 of the mounting lugs 50 and 52.

These drilling indicia are usable by the user of a box 10 in drilling the holes 60 on the end walls or on the side walls. The lines 64, 66 are perpendicular to line 68, and are spaced apart by a dimension substantially equal to twice the dimension 48. Similarly, the line 66 are each spaced from the inner surface of side walls 16, 20, by dimensions that are also substantially equal to the dimension 48. Accordingly, when the user uses these drilling indicia, the maximum number of conduit sockets are possible of mounting on the junction box 10. That is, each end wall will accept two conduit sockets, and each side wall will accept three conduit sockets in a row. Further, it is possible for the user to mount additional conduit sockets through back wall 14, as may be called for by the needs of a particular installation of the junction box 10. Those ordinarily skilled in the pertinent arts will recognize that the drilling indicia need not be formed by the intersection of lines. For example, the provision of a simple dimple at the respective center of each drilling indicia location will suffice to allow a user of the junction box to start a drill bit at that location.

Figure 5:
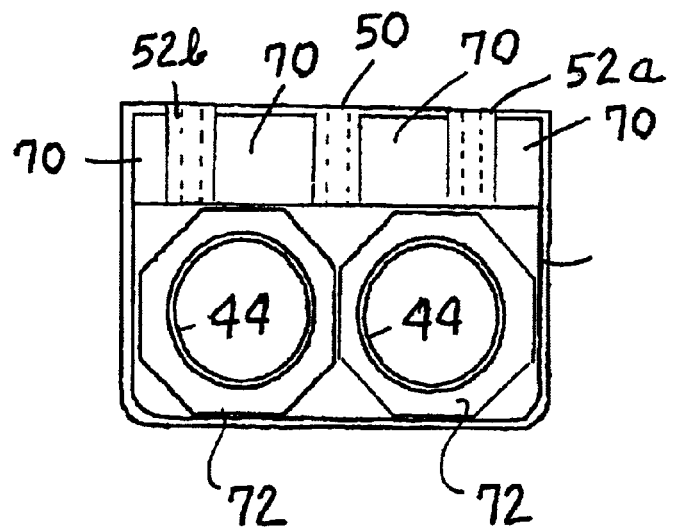
FIG. 5 is an inside end view, partly in cross section, of the alternative embodiment of junction box seen in FIG. 4.

Attention now to FIGS. 4 and 5 will show an alternative embodiment of the present inventive junction box. This alternative embodiment of the junction box differs from the embodiment of FIGS. 1–3 essentially with respect to the structure of the mounting lugs, and is otherwise substantially similar. Thus, because the embodiment of FIGS. 4 and 5 has many features in common with the embodiment of FIGS. 1–3, and 6, 7, these features are indicated with the same numeral used above, and increased by one hundred (100). Thus, in many instances it will be seen that features may be common to both the embodiment of junction box 10, and to the embodiment of junction box 110. It will be appreciated also that the junction box of FIGS. 1–3, and 6, 7, has many features in common with the embodiment of FIGS. 4 and 5, which features may be described hereinbelow by reference to the embodiment of junction box 110. The explanation of the drilling indicia 62–68 has already made use of this commonality between the embodiments of FIGS. 1–3, and 6, 7, and that of FIGS. 4 and 5.

To describe the mounting lugs of the embodiment of junction box 110, it is seen in FIGS. 4 and 5 that in the junction box 110, the placement of the mounting lugs 150, 152 is seen. However, in this embodiment, it is seen that the mounting lugs are not individually cantilevered from the end walls 118, 122, but are supported in addition to their cantilever mounting from these end walls by an integral web 70 extending from side to side of the box 110, and integrally joining with the side walls 116, 120 at its opposite ends. This web 70 integrally joins each of the mounting lugs 150, 152 at each end of the box 110 to one another (i.e., into a group of three integrally conjoined and mutually supporting mounting lugs) so that these mounting lugs have a mutually supporting structural relationship.

Importantly, (and in common with the embodiment of FIGS. 1–3) the embodiment of junction box seen in FIGS. 4 and 5 will be prepared for installation of conduit sockets 44 as was described above. That is, a user for the box 110 drills through holes at locations where the conduit sockets 44 are desired, and installs these conduit sockets as is further described below.

Again, it is to be understood that the junction box 110 also includes similar drilling indicia 162 disposed outwardly on each of the end and side walls 116–122 (it was noted above that similar drilling indicia are present on walls 16–22 of the embodiment of FIGS. 1–3, and 6, 7). These drilling indicia 162 are formed by the intersection of a circumscribing line 168 (not seen in the drawing Figures), and respective perpendicular lines 164, 166 (also not seen in the drawing Figures, but indicated with arrowed reference numerals) extending from front to back of the junction box 110. The drilling indicia 162 share the same relationship of being spaced apart by twice the dimension 48, and of being spaced from the back wall 114 and from the end walls 118, 122 by this dimension 48.

Especially Configured Nut Member

In the installation and securement of the conduit sockets 44 to the walls 14–22 (and 114–122) of the junction boxes 10, 110, an especially configured nut member 72 (best seen in FIGS. 8a and 8b) is preferably utilized. This nut member 72 is configured to allow the closest practicable spacing of the conduit sockets 44, both from one another and from the adjacent walls of the junction box 10, 110, as was described above. That is, the nut member 72 is especially configured to allow the conduit sockets to be spaced by the dimension 48 either from a side or end wall of the junction box 10 or 110, or by this dimension from another conduit socket.

As will be seen, the nut member 72 is also especially configured to allow it to be manufactured using low cost injection molding methods. The nut member 72 is in particular configured so that its manufacturing by use of injection molding does not require the conventional use of a rotary core as part of the tooling for molding of this nut member. Those ordinarily skilled in the pertinent arts will understand that in the injection molding of many parts having internal threads (i.e., including items such as a nut) the internal thread requires that a core member unscrew and withdraw from the internal thread as the tooling parts at an end stage of the injection molding process, and so that the molded part can separate from the tooling. The molded nut member of FIGS. 8a and 8b avoids this conventional necessity.

Considering FIGS. 8a and 8b, it is seen that the preferred embodiment of nut member 72 has a nut member body 74 made of injection molded plastic. This nut member body 74 internally defines a through bore 76, and externally defines plural flats 78 (or other such gripping features, plural axially extending ribs, for example, allowing the nut body to be grasp with a gripping or wrenching tool). Within the through bore 76, the nut body 74 defines a single helical thread 80 having circumferentially opposite ends 82 and 84. Viewing FIGS. 8a and 8b, it is seen that the opposite ends 82 and 84 do not overlap one another in the circumferential direction, and are in fact spaced slightly away from one another circumferentially so that an axially extending gap 86 is defined between these thread ends 82 and 84. Because the thread ends 82 and 84 do not overlap, simple axially moving and non-rotational cores can be used to mold the nut member 72. These axially moving cores each will move out of the nut member with no need to unscrew from the single helical thread 80. As is seen in FIGS. 2 and 5 (both embodiments being referred to in common in this portion of the description, and the increase of reference numerals by 100 being discontinued, except as seen below), when the conduit sockets 44 are installed into drilled through holes (like holes 60) drilled at the locations indicated by drilling indicia 62, or at any other location chosen by a user of the junction box 10, then adjacent confronting flats 78 of adjacent nut members 72 will engage one another and prevent the nut members from rotating. Further, other flats 78 of the nut members 72 will engage either the side walls 16, 20, the end walls 18, 22, or the back wall 14 (or several of these walls), of the junction boxes 10, 110 to prevent unwanted rotation of the nut members 72.

As is seen in FIGS. 2 and 5, for example, the flats 78 of the nut members 72 engage one another, and also engage each of the back wall 14, and side walls 16 or 20. This combinational engagement of the flats 78 of the nut members 72 with one another and with adjacent walls of the junction box 10, 110 means that the conduit sockets may be tightened snugly into the nut members 72, so that these conduit sockets are securely attached to the junction boxes 10, 110. Ordinarily, as the conduit sockets 44 are installed into the junction boxes 10, 110, a small dollop of PVC pipe adhesive may also be applied to the threads of the conduit socket. This adhesive both welds the conduit socket 44 to the junction boxes 10, 110, as well as providing a liquid-tight seal between the conduit socket 44 and the junction boxes 10, 110.

In view of the above, is seen that the junction boxes 10, 110 can receive as few as one conduit socket (i.e., placed according to the user's discretion and wishes), or can receive as many as ten conduit sockets mounted to side walls of the junction box (i.e., three in each side wall, and two in each end wall). Further, because the entire area of the back wall 14 is available to receive additional conduit sockets, an array of as many as six conduit sockets may be installed into the back wall 14 (only three additional conduit sockets can be received into back wall 14 if each of walls 16–22 carries its full compliment of conduit sockets). Again, the number and placement of the conduit sockets is according to the user's discretion, wishes, and the various requirements of each particular installation of the junction box 10, 110. The back wall 14 may similarly be provided with drilling indicia (not seen in the drawing Figures) for positioning the array of as many as six conduit sockets (i.e., if that many are to be installed on the back wall 14). Again, it will be understood that when a particular wall of a junction box 10, 110 is to receive fewer than its full maximum compliment of conduit sockets, then the user of the junction box may have greater flexibility in where the holes for these conduit sockets are drilled. However, when the user wishes to install the maximum practicable number of conduit sockets on any particular wall of the junction box, then use of the drilling indicia 62 will facilitate this goal.

This flexibility of the number and location of the conduit sockets which the junction boxes 10, 110 may receive (i.e., from only one conduit socket to as many as thirteen conduit sockets) provides an extraordinary flexibility of installation and use for the junction boxes 10, 110.

Third Junction Box Embodiment

Attention now to FIGS. 8–11 illustrates yet another alternative embodiment of the present invention, which alternative embodiment offers particularly high utility as a result of mounting flexibility or adaptability. As has been seen above, the present junction box offers unique elements of flexibility and adaptability in its installation. The embodiment of FIGS. 8–11 carries this flexibility and adaptability to another and yet higher level. Because the embodiment of FIGS. 8–11 has many features which are the same as, or which are analogous in structure or function to, features illustrated and described above, these features are referenced on FIGS. 8–11 using the same reference numeral used above, and increased by four hundred (400).

Figure 8:
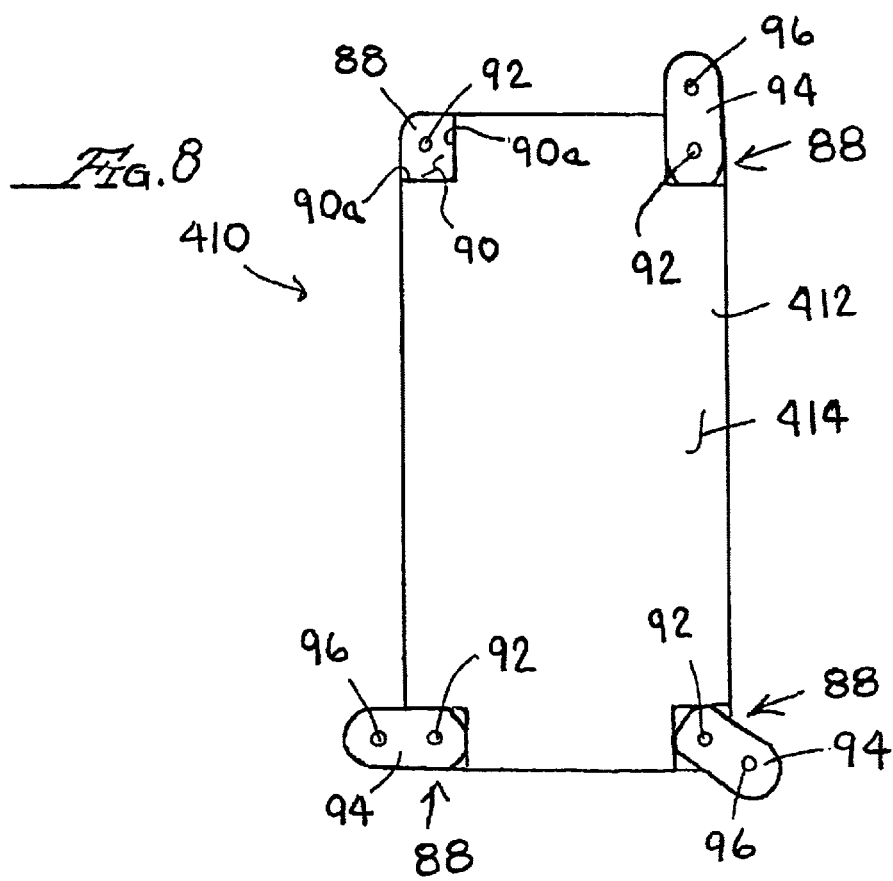
FIG. 8 is an outside elevation view of the back wall of a junction box according to one particular embodiment of the invention, along with three flexible (or variable position) mounting tabs of the invention.

FIG. 8 illustrates the back side of a junction box 410. That is, FIG. 8 shows the outer surface of the back wall 414 of a junction box 410. In this case, the back wall 414 of the junction box 410 defines four corner recesses, each indicated with the numeral 88. Each corner recess 88 is rather shallow (as is best seen in FIG. 9), and includes a recess floor 90. This recess floor is bounded by a pair of recess side walls 90a, which intersect with the floor 90 and with each other at substantially a right (perpendicular) angle. Centrally located of each of the recesses 88, and projecting upwardly in this recess perpendicularly to the back wall 414, is a respective locating pin 92. Received on the mounting pin 92, and adhesively secured to the pin, and to the floor surface 90, is a tab member 94. These tab members 94 define a locating hole 94a, and are attached to the junction box 410 in any one of three possible positions as is preferred by the user of the junction box. As FIG. 8 illustrates, the tab members 94 may be installed into the recesses 88 and onto the mounting pin 92 at locating hole 94a in any one of three possible positions. These three possible positions include a position parallel to an end wall, parallel to a side wall, or at an angle of substantially 45 degrees to each of the side and end walls. As is seen in FIG. 8, the tab members 94 provide a mounting hole 96 for the junction box 410. That is, the junction box 410 may be secured to a mounting surface by a screw or nail that passes through the hole 96.

As FIG. 11 illustrates, the mounting tabs 94 provide for their adhesive installation into the recesses 88 in any one of the three possible positions illustrated by FIG. 8 by the provision on these tab members 94 of a trio of engagement surfaces. These engagement surfaces are indicated in FIGS. 8 and 11 with the numerals 98a, 98b, and 98c. Each of these three engagement surfaces 98a/b/c is disposed at an effective angle of 45 degrees (135 degrees internal measurement, 225 degrees external measurement) relative to the adjacent engagement surface. The tab members 94 also have a pair of opposite and parallel side surfaces 100a/b. Thus, when selected ones of the engagement surfaces 98a/b/c, and/or side surfaces 100a/b are engaged with the recess side walls 90a, and dependent upon which two of the engagement surfaces or side surfaces are engaged with the side walls 90a, the tab members 94 will have one of the three possible angular positions relative to the junction box 410, as is seen in FIG. 8.

Dual Junction Box Combination

Turning now to FIGS. 12–14b, yet another alternative embodiment according to the present invention is illustrated. In this embodiment, two junction boxes according to the embodiment of FIGS. 8–11 are united as will be further explained below to make a composite junction box, indicated with numeral 102. The composite junction box 102 includes two junction boxes 610, which individually are essentially the same as junction box 410 seen in FIG. 8. These two junction boxes 610 are connected to one another by a pair of "close set" or "close coupled" connection assemblies, each indicated with the numeral 104, viewing FIGS. 12 and 13. These "close set" or "close coupled" connection assemblies unit the two junction boxes 610 into an essentially integral unity, with the two junction boxes set much closer to one another than has heretofore been possible to accomplish. This closeness of the two junction boxes 610 to one another is achieved because there is no intervening conduit socket between the two junction boxes. Each connection assembly 104 instead is composed of a short section or "nipple" of conduit, and a trio of spacer members 106. These spacer members 106 are in all respects save one, the same as the nut members 72 seen above. That one point of distinction is that the spacers 106 have no internal thread 80, and are instead adhesively bonded to a section of conduit and to the junction boxes 610. That is, as is seen best in the fragmentary cross section of FIG. 13, each connection assembly 104 includes a short section 108 of conduit, and a centrally placed spacer 106a intermediate of the ends of this conduit section 108 and between the junction boxes 610. Within each junction box 610, and also adhesively bonded to the section 108 of conduit are an end pair of spacers 106b and 106c. The spacers 106b and 106c are each within a respective one of the joined junction boxes 610, and each is bonded to the conduit section 108 so that the respective wall of the particular junction box 610 is captively received between the center spacer 106a, and the respective one of the pair of end spacers 106b and 106c. The section of conduit 108 provides for communication of wires between the junction boxes 610 within the composite junction box 102.

Viewing FIGS. 12 and 13, it is seen that the composite junction box 102 is configured to be elongate in the direction of the length of each junction box 610. It will be understood that the invention is not so limited, and that more than a pair of junction boxes may be so united into a composite junction box. That is, the junction boxes of a composite junction box may be united in side-by-side (i.e., rather then end-to-end) relationship. Further, a composite junction box may be assembled within the teaching of the present invention which includes a two dimensional array of joined junction boxes, united in both side-by-side, and in end-to-end connection. Further, according to the volume requirements of a particular installation, and the installer's preferences, the junction boxes of a composite junction box may be joined in end-to-side, and side-to-end relationship. Thus, a composite junction box of virtually unlimited volume, and shape may be made according to the present invention.

Conduit Coupling with Provision for Variable Spacing at Mounting

FIGS. 15–18 illustrate another alternative embodiment of this present invention. As is seen in FIG. 18, a length or "run" of conduit 109 is secured at the adjacent ends of parts of the conduit run by using a conventional conduit clamp 110, which clamp is conventionally secured to underlying structure (not seen in the drawing Figures) by use of a fastener 112, such as a screw or nail. Further, those ordinarily skilled in the pertinent arts will know that it is common practice to unit lengths of conduit by use of conduit couplings. For metal electrical conduits, these conventional couplings are conventionally a metal sleeve having an opposite pair of axially aligned conduit sockets, each for receiving one of adjacent ends of two lengths of metal conduit, each to be secured by a respective one of a pair of cone point set screws carried by the conduit coupling. With metallic electrical conduit, this metallic conduit well withstands the stresses imposed by such conduit clamps, in combination with such misalignments in the installation of the conduit as may occur. For plastic electrical conduits, conventional couplings are a simple plastic sleeve having an opposite pair of axially aligned conduit sockets. Again, each of the conduit sockets received one of the adjacent ends of two lengths of plastic conduit. With the plastic conduit and plastic couplings, the conduits are adhesively bonded into the couplings. However, for plastic electrical conduits, such stresses of installation and misalignment of a run of conduit can be excessive and may overload the conduit sockets at the couplings, or at the junction boxes, and can possibly lead to fracturing of the conduit, or of the conduit sockets from the junction boxes, or at the couplings. One of the sources of such stresses is a misalignment of the conduit with respect to the underlying structure to which it is secured.

Accordingly, the present invention provides a conduit coupling 114, which defines a pair of oppositely extending conduit sockets 116 (only one of which is seen, in FIG. 17). These conduit sockets provide for adhesively receiving an end portion of a run of conduit. However, this novel coupling has a boss 118 on one side, providing a mounting surface 120 extending parallel to the axis of the coupling. The coupling 114 also provides on boss 118 a pair of parallel mounting pins 122. These mounting pins 122 each define one or more "clipping necks" 124 (two such necks in the illustrated embodiment), at which the length of the pins may be conveniently shortened by use of a pair of scissors or cutters (i.e., common diagonal cutters, for example).

Importantly, the mounting pins 122 are spaced apart by a distance agreeing with the spacing between holes 94a and 96 of the tab members 94, seen in FIGS. 8 and 11. As FIG. 18 illustrates, a pair of tab members 94 may be received over the pins 122 and may rest upon the surface 120 of boss 118 to serve as spacers spacing the coupling 114 away from the support structure to which the conduit clamp 110 is secured. Accordingly to the illustrated embodiment, the pins 122 are long enough to accept three of the mounting tabs 94 as spacers, although the invention is not so limited. Further, the pins 122 may be easily shortened by cutting at a selected neck 124 so that the pins accept two, or one, or no mounting tabs 94 as spacers between the boss surface 120 of coupling 114 and the support structure. Thus, the conduit 109 may be aligned as necessary relative to the support structure in order to reduce or eliminate stressing in the conduit and couplings. Importantly, misalignments of the conduits relative to conduit sockets at junction boxes may be reduced or eliminated by use of the coupling 114 seen in FIGS. 15–18.

Fourth Embodiment of Junction Box

Attention now to FIGS. 19–21 will reveal a fourth alternative embodiment of a junction box embodying this present invention. This alternative embodiment of the junction box differs from the embodiments described earlier principally with respect to the structure of the junction box providing for attachment of one or more electrical conduits to the junction box. Thus, because the embodiment of FIGS. 19–21 has many features in common with the embodiment of FIGS. 1–3, and 6, 7, these features are indicated with the same numeral used above, and increased by one thousand (1000). It will be appreciated also that the junction box 1010 provides a high-volume, high-utility, non-conductive enclosure (i.e., a junction box) for the placement of electrical components and wiring. In FIG. 19 the junction box 1010 embodying the present invention is seen. This junction box 1010 includes a chambered prismatic body 1012 formed of non-conductive plastic material. More particularly, the body 12 may preferably be injection molded of polyvinyl chloride (PVC), or of other thermoplastic or thermoset polymer materials known in the art. The body 1012 includes a back wall 1014, and plural (i.e., at least four) contiguous walls 1016, 1018, 1020, and 1022 which are generally perpendicular to the back wall 1014. The contiguous walls 1016–1022 are joined integrally to the back wall 1014, and are each also integrally joined to each of the two adjacent ones of the plural walls 1016–1022. These walls 1016–1022 are arranged in opposing pairs of generally parallel walls, and the adjacent walls are integrally joined to one another to form corner junctions 1024, 1026, 1028, and 1030.

Further to the above, the wall 1022 closest to the viewer of FIG. 19 defines a generally rectangular insert recess 126, best seen in FIG. 20. This insert recess 126 is defined only in wall 1022 according to the embodiment illustrated in FIGS. 19 and 20, although the invention is not so limited. In other words, in addition to or instead of the wall 1022 defining an insert recess 126, any one or all of the other walls 1016, 1018, or 1020 may define a similar insert recess. As is best seen in FIG. 20, the insert recess 126 includes a larger sized portion 126*a*, a smaller sized portion 126*b*, and a shoulder 126*c* defined by the cooperation of portions 126*a* and 126*b*.

In FIG. 19, an insert member 128 is shown received into the insert recess 126. This insert member 128 has a rectangular body portion 128*a*, which is sized and shaped to be matchingly received into the insert recess 126. That is, as is seen best in FIG. 20, the rectangular body portion 128*a* of insert member 128 defines an end surface 128*b* which is engageable against the shoulder 126*c*. Preferably, the insert member 128 is adhesively secured into the recess 126, generally as is illustrated in FIG. 19.

Importantly, the insert member 128 defines a pair of extending bosses 130, each of which defines a stepped through bore 130*a*. Each through bore 130*a* is sized and configured to provide a respective conduit socket 130*b* (indicated by the arrowed reference number). A respective plastic electrical conduit (not shown in the drawing Figures) may be adhesively secured into each conduit socket 130*b*. An important feature of the insert member 128 is that the conduit sockets 130*b* may be of differing sizes. In other words, an insert member with two ½ inch sockets may be provided, and another insert member with two ¾ inch sockets, and perhaps another insert member with two one inch sockets may be provided. Still another insert member may have two sockets of different sizes, perhaps on of ½ inch size, and the other of ¾ inch size. Still further, as FIG. 21 illustrates, an alternative insert member 132 having only a single conduit socket (i.e., still referenced with the numeral 130*b*) may be provided. Again, the single socket 130*b* of the insert member 132 may be provided in a variety of different sizes.

In view of the above, it is apparent that a single junction box structure 1010 may be utilized with a variety of different insert members 128/132 in order to connect with a wide range of different sizes of conduits. That is, an electrician who is installing the junction box 1010 need only carry a single configuration and size of box, and then also carry a variety of relatively small and inexpensive insert members 128/132 in order to provide for an installation with a variety of different sized conduits. This flexibility of installation for the junction box 1010 greatly increases its utility over conventional junction boxes.

Additional Alternative Embodiments of Junction Box

Turning now to FIGS. 22 through 25, alternative embodiments of junction boxes (each indicated with the numeral 1010 having one or more primes (') added thereto) are illustrated. The junction box 1010' seen in FIGS. 22 and 23 is similar to the one seen in FIGS. 19–22, except that it includes a pair of oppositely extending integral mounting ears 11', and defines a pair of square insert recesses 126'. Because the box 1010' includes the integral ears 11', the box does not include corner recesses like those indicated with the numeral 88 in earlier embodiments. Further, the insert recesses 126' are paired side by side, and are disposed on the end wall of the junction box seen in FIGS. 22 and 23, although the invention is not so limited. A single-conduit insert member 132' is provided for insertion (i.e., and adhesive retention) in the insert recesses 126'. That is, the insert member 132' provides for connection of only a single conduit to the junction box 1010'. These single-conduit insert members 132' may be provided with conduit sockets (again indicated with the arrowed numeral 130*b*), and the conduit socket may be provided in a variety of different sizes. In this respect then, the embodiment of FIGS. 22 and 23 is similar to that of FIG. 21, except that the single conduit insert member 132' has a smaller base portion, and the junction box provides for one, or for a pair (or more) of these insert members to be received at a particular wall of the junction box. Again, this embodiment offers a great variety of installation combinations and permutations according to the choices of an installer, and using only a single junction box body, along with a variety of small and inexpensive insert members which may be provided in differing sizes.

FIGS. 24 and 25 illustrate that the shape of the insert recess (and of the body portion of matching insert members) need not be rectangular, square, or any restricted shape. That is, the insert recess 126" (and insert member body portion) may be oval as shown in FIG. 24. Alternatively, a junction box may be provided with a bicameral insert recess 126''', which as shown in FIG. 25, is symmetrical and has two semi-circular portions joined along a cord line. The insert recess need not be symmetrical.

Offsetting of Conduits and Joining of Junction Boxes

Finally, attention now to FIGS. 26 through 28 will show still another alternative embodiment of the present inventive junction box. This alternative embodiment of the junction box differs from the embodiments described earlier principally with respect to the structure of the insert member providing for attachment of one or more electrical conduits to the junction box. That is, the junction box itself may be the same as that indicated with numeral 1010 in FIGS. 19–21. However, in this alternative embodiment, the insert member 128' has one or a pair of conduit bosses 130', each with a respective conduit socket 130*b*', each provided with a determined offset relative to the body 128*a*' in side elevation view. In other words, viewing FIGS. 26 and 27 in conjunction with one another it is seen that the conduit sockets 130*b*' are offset downwardly relative to the junction box 1010. Thus, the conduits (not illustrated) which are received into the conduit sockets 130*b*' are disposed closer to the surface on which the junction box is or may be mounted (i.e., at the plane of the back wall of the junction box, for example). These conduits are thus easier to mount to other respective mounting surfaces (recalling the explanation of FIGS. 15–18), and stresses in the conduits can be reduced.

On the other hand, FIG. 28 depicts that this same insert member 128' may be inserted into the insert recess 126 with the offset being in the upward direction and away from the mounting surface on which the junction box 1010 is or may be secured. Such a mounting for the insert member 128' may be utilized in situations requiring the conduits to clear an obstacle which is disposed close to the junction box. It is apparent that insert members having differing amounts of offset may be provided and that these differing insert members may be used with a single design of junction box to provide a great variety, flexibility, and utility in installation of the junction box.

Viewing now FIGS. 29 and 30, a coupling member 134 is illustrated, which coupling member is utilized to join together two of the junction boxes 1010a and 1010b, as is illustrated in FIG. 30. This coupling member 134 has a body 134a configured as a rectangular tube, having a rectangular through passage 134b. Thus, when such a coupling member 134 is utilized to join two of the junction boxes 1010, as is seen in FIG. 30, the result is that a large rectangular passage 134b is provided extending between and connecting the junction boxes, and through which wires and other connections may be routed.

Installation Flexibility of the Inventive Junction Box

Now that the structure of the junction boxes 10, 110, 410 and 610 has been disclosed, additional attention may be directed to methods of use for the present invention. It will be appreciated in view of the above, that the junction boxes are provided to a user with each of the walls 14–22 being free of holes for conduit sockets 44. That is, the back wall 14, end walls 18, 22, and side walls 16, 20, provide their full area into which the user may install conduit sockets by locating and drilling installation holes for these conduit sockets wherever desired.. If the user wishes to install the maximum possible number of conduit sockets 44, then the drilling indicia 62 are preferably used so that the mutually engaging and locking engagements of the nut members 72 with one another and with interior wall surfaces of the junction box is accomplished, as described above. Further, the end walls 18, 22 have portions 18' and 22' which are disposed below the mounting lugs 50, 52 (150, 152) so that this portion of the walls 18, 22 is also available for receiving conduit sockets positioned according to the user's wishes. Again, in the event that the user wishes to install a full complement of conduit sockets at either wall 18, 22, then the drilling indicia 62 are preferably utilized to locate these holes.

As a user of the junction boxes 10, 110 decides how many and in what locations that conduits are to be attached to the junction box, the numbers and locations of the holes to be drilled in the walls 14–22 are also determined. Then the user drills the necessary holes in walls 14–22, and installs the conduit sockets. Experience in the art has shown that this flexibility to install differing numbers of conduit sockets in differing locations on the junction boxes 10, 110 is far preferable to having either a junction box with predetermined locations (i.e., knockouts) for conduit sockets, and is also preferable to having to carry a variety of different junction boxes to job sites. Most users of junction boxes would prefer to take with them to job sites only a single design of junction box (boxes 10 and 110 being considered as a single design in this respect), and to also take a hand drill or drill press and drill bits allowing the necessary holes for conduit sockets to be drilled as necessary in the field at a job site.

Further it will be appreciated that because the mounting lugs 50, 52 (and 150, 152) extend from the plane of opening 42, 142 toward but short of the back wall 14, 114, that the volume of the chamber 40, 140 is accordingly increased in comparison to conventional non-conductive junction boxes. That is, the non-conductive junction boxes 10, 110 provide the maximum practicable volume for chamber 40, 140, that can be achieved in a particular exterior size of junction box, and with a view to the necessary structural thickness of the walls 14–22. Accordingly, the junction boxes according to this invention provide an additional element of further improved utility for the junction boxes because user's have additional volume within the box so that wire terminations (i.e., wire secured with twist-on wire connections, for example) can be fitted into the junction boxes.

Further, as FIGS. 8–11 illustrated, a junction box according to this invention may provide a unique flexibility in installation because the mounting tabs 94 can be located in a variety of positions according to the installation requirements of a particular job. Also, groups of plural junction boxes according to this invention may be secured together in order to provide a composite (or aggregate) junction box, in which the cavities of the individual junction boxes are close together, and are communicated to one another by a relatively large number of short interconnecting assemblies (recalling FIGS. 12–14b. Finally, this invention provides a device (coupling 114) the use of which allows an installer of junction boxes and plastic interconnections conduits to greatly reduce or eliminate the installation stress imposed on the plastic conduit and the conduit sockets into which such conduit is secured. It will be recalled from FIGS. 14a and 14b that the spacer members 106 are substantially the same as nut members 72, In fact, the spacer members may be manufactured by using the same injection molding equipment, but with a core not having provision to make the thread 80. Thus, nut members manufactured without thread 80 become spacers 106. Alternatively, an installer may take nut members 72 and quickly drill out the thread 80 to make spacers 106 for the aggregate junction box assembly seen in FIGS. 12 and 13. Still further, the tab members used in mounting the junction box embodiment of FIGS. 8–11, find another use as spacers in the embodiment of the conduit coupling seen in FIGS. 15–18. Thus, the installers using the junction box embodiments of this invention will find that they have a relatively few number of different parts to carry to a job site, which parts go together in a variety of different ways to allow junction box installations, and to make aggregate junction boxes, and to mount conduits with reduced stress levels.

Those skilled in the art will further appreciate that the present invention may be embodied in other specific forms without departing from the spirit or central attributes thereof. Because the foregoing description of the present invention discloses only particularly preferred exemplary embodiments of the invention, it is to be understood that other variations are recognized as being within the scope of the present invention. Accordingly, the present invention is not limited to the particular embodiment which has been described in detail herein. Rather, reference should be made to the appended claims to define the scope and content of the present invention.

We claim:

1. A high-volume, high-utility, non-conductive enclosure for electrical components and wiring comprising, a molded polymer junction box including a non-perforate back wall, and plural non-perforate contiguous walls extending generally perpendicularly to said back wall, and each one of said plural contiguous walls joining integrally to the back wall and also to adjacent ones of said plural contiguous walls, said back wall and said plural contiguous walls cooperatively defining a chamber within said junction box, with said plural contiguous walls at respective end edges cooperatively forming an opening to said chamber, at least one of said plural contiguous walls carrying an integral mounting lug member extending across said opening, and said mounting lug member also extending inwardly of said chamber from substantially said end edge of said at least one wall toward but short of said back wall to define a termination surface, whereby an electrical component may be inserted via said opening into said chamber to be secured within the junction box at said mounting lug.

2. The enclosure of claim 1 wherein said one wall defines a wall portion extending from said termination surface to said back wall, whereby said wall portion provides a wall surface within said junction box for receiving a conduit socket.

3. The enclosure of claim 2 wherein at least a selected one of said plural contiguous walls carries on an outer surface thereof a drilling indicia for positioning a conduit socket.

4. The enclosure of claim 3 wherein said at least selected one of said plural contiguous walls carries plural drilling indicia, and each one of said plural drilling indicia are further spaced from each of: an inner surface of said back wall, and from an inner surface of an adjacent one of said plural contiguous walls by a determined distance, and are spaced from an adjacent drilling indicia by twice said determined distance.

5. The enclosure of claim 1 wherein said mounting lug cantilevers from said at least one of said plural contiguous walls.

6. The enclosure of claim 5 wherein said at least one of said plural contiguous walls carries plural mounting lugs integrally joining with said at least one wall.

7. The enclosure of claim 6 wherein said plural mounting lugs each cantilevers from said one of said plural contiguous walls.

8. The enclosure of claim 7 wherein each of said plural mounting lugs is independent of each other mounting lug of said plural mounting lugs.

9. A high-volume, high-utility, non-conductive enclosure for electrical components and wiring comprising: a molded polymer junction box including a non-perforate back wall, and plural non-perforate contiguous walls extending generally perpendicularly to said back wall, and each one of said plural contiguous walls joining integrally to the back wall and also to adjacent ones of said plural contiguous walls, said back wall and said plural contiguous walls cooperatively defining a chamber within said junction box, with said plural contiguous walls at respective end edges cooperatively forming an opening to said chamber, at least one of said plural contiguous walls carrying an integral mounting lug member extending across said opening, and said mounting lug member also extending inwardly of said chamber from substantially said end edge of said at least one wall toward but short of said back wall to define a termination surface, whereby an electrical component may be inserted via said opening into said chamber to be secured within the junction box at said mounting lug:

wherein said one wall defines a wall portion extending from said termination surface to said back wall; whereby said wall portion provides a wall surface within said junction box for receiving a conduit socket, wherein at least a selected one of said plural contiguous walls carries on an outer surface thereof a drilling indicia for positioning a conduit socket;

wherein said at least selected one of said plural contiguous walls carries plural drilling indicia, and each one of said plural drilling indicia are further spaced from each of: an inner surface of said back wall and from an inner surface of an adjacent one of said plural contiguous walls by a determined distance, and are spaced from an adjacent drilling indicia by twice said determined distance, further including a nut member threadably engageable with a conventional conduit socket member, said nut member providing plural flats each substantially at a radius of said determined distance, and which plural flats when said nut member is centered substantially at one of said plural drilling indicia are engageable with one of: said inner surface of said back wall, with said inner surface of an adjacent one of said plural contiguous walls, or with a confronting flat of an adjacent nut member which is also centered at an adjacent drilling indicia, whereby, said nut member engages one or more of said inner wall surfaces and another nut member to substantially prevent said nut member from rotating when a conduit socket member is tightened into said nut member.

10. The enclosure of claim 9 wherein said nut member comprises:

a nut member body of injection molded plastic, the nut member body internally defining a through bore, and externally defining surface features allowing the nut member body to be grasp with a gripping or wrenching tool;

said nut member body also defining within said through bore a single female helical thread having circumferentially opposite thread ends, said opposite thread ends being spaced slightly from one another circumferentially and not overlapping one another in the circumferential direction so as to define an axially extending gap.

11. The enclosure of claim 10 wherein said nut member external surface features include plural wrenching flats.

12. The enclosure of claim 10 wherein said nut member external surface features include plural axially extending ribs.

13. A high-volume, high-utility, non-conductive enclosure for electrical components and wiring comprising: a molded polymer junction box including a non-perforate back wall, and plural non-perforate contiguous walls extending generally perpendicularly to said back wall and each one of said plural continuous walls joining integrally to the back wall and also to adjacent ones of said plural contiguous walls, said hack wall and said plural contiguous walls cooperatively defining a chamber within said junction box, with said plural contiguous walls at respective end edges cooperatively forming an opening to said chamber, at least one of said plural contiguous, walls carrying an integral mounting lug member extending across said opening and said mounting lug member also extending inwardly of said chamber from substantially said end edge of said at least one wall toward but short of said back wall to define a termination surface, whereby an electrical component may be inserted via said opening into said chamber to be secured within the junction box at said mounting lug, wherein said mounting lug cantilevers from said at least one of said plural contiguous walls;

wherein said at least one of said plural contiguous walls carries plural mounting lugs integrally joining with said at least one wall;

wherein said plural mounting lugs each cantilevers from said one of said plural contiguous walls;

further including an elongate web member extending transversely of said junction box, and said web member integrally joining with each of said plural mounting lugs.

14. The enclosure of claim 13 wherein said web member has a pair of opposite ends, and said web member further joins integrally at each of its opposite ends with respective ones of said plural contiguous walls.

15. A molded non-conductive plastic junction box comprising a non-perforate back wall and four contiguous non-perforate integral side walls each joined both to the back wall and to two adjacent ones of the four contiguous side walls, said four contiguous side walls being disposed in spaced apart opposite pairs, said back wall and four side walls cooperatively bounding a chamber within said junction box, and each side wall terminating at an end edge substantially in a common plane to cooperatively define an opening to said chamber, and one of said four contiguous side walls carrying an integral mounting lug extending from said one side wall toward the opposite one of said side walls, said mounting lug also extending from substantially said common plane toward but short of said back wall, and said one wall providing a wall portion extending from said mounting lug to said back wall which is unobstructed and available for mounting of a conduit socket therein, whereby said junction box provides increased interior volume and increased wall area for the mounting of conduit sockets.

16. The junction box of claim 15 wherein because each of said back wall and said four side walls are non-perforate, whereby said back wall and each of said four side walls each have no openings though which to connect a conduit socket, whereby the full area of said back wall and said four side walls is available so that a user can make one or more holes where desired in said walls in order to mount one or more conduit sockets on said junction box where desired.

17. The junction box of claim 15 wherein at least one of said four side walls includes outwardly disposed drilling indicia, said drilling indicia being spaced from in inside surface of said back wall, and from an inside surface of an adjacent one of said four side walls by a determined distance.

18. The junction box of claim 15 wherein said mounting lug cantilevers from said one of said four side walls.

19. The junction box of claim 18 wherein said one side wall carries plural mounting lugs integrally joining with said one side wall.

20. The junction box of claim 19 wherein said plural mounting lugs each cantilevers from said one side wall.

21. The junction box of claim 20 wherein each of said plural mounting lugs is independent of each other mounting lug of said plural mounting lugs on said one side wall.

22. A molded non-conductive plastic junction box comprising a back wall and four contiguous integral side walls each joined both to the back wall and to two adjacent ones of the four contiguous side walls, said four contiguous side walls being disposed in spaced apart opposite pairs, said back wall and four side walls cooperatively bounding a chamber within said junction box, and each side wall terminating at an end edge substantially in a common plane to cooperatively define an opening to said chamber, and one of said four contiguous side walls carrying an integral mounting lug extending from said one side wall toward the opposite one of said side walls, said mounting lug also extending from substantially said common plane toward but short of said back wall, and said one wall providing a wall portion extending from said mounting lug to said back wall which is unobstructed and available for mounting of a conduit socket therein, whereby said junction box provides increased interior volume and increased wall area for the mounting of conduit sockets:

wherein at least one of said four side walls includes outwardly disposed drilling indicia, said drilling indicia being spaced from an inside surface of said back wall, and from an inside surface of an adjacent one of said four side walls by a determined distance, further including a nut member threadably engageable with a conventional conduit socket member, said nut member providing plural flats each substantially at a radius of said determined distance, and which plural Hats when said nut member is centered substantially at one of said plural drilling indicia are engageable with one of: said inner surface of said back wall, with said inner surface of an adjacent one of said four side walls, or with a confronting flat of an adjacent nut member which is also centered at an adjacent drilling indicia; whereby, said nut member engages one or more of said inner side wall surfaces and another adjacent nut member to substantially prevent said nut member from rotating when a conduit socket member is tightened into said nut member.

23. A molded non-conductive plastic junction box comprising a back wall and four contiguous integral side walls each joined both to the back wall and to two adjacent ones of the four contiguous side walls, said four contiguous side walls being disposed in spaced apart opposite pairs, said back wall and four side walls cooperatively bounding a chamber within said junction box, and each side wall terminating at an end edge substantially in a common plane to cooperatively define an opening to said chamber, and one of said four contiguous side walls carrying an integral mounting lug extending from said one side wall toward the opposite one of said side walls, said mounting lug also extending from substantially said common plane toward but short of said back wall, and said one wall providing a wall portion extending from said mounting lug to said back wall which is unobstructed and available for mounting of a conduit socket therein, whereby said junction box provides increased in tenor volume and increased wall area for the mounting of conduit sockets;

wherein said mounting lug cantilevers from said one of said four side walls;

wherein said one side wall carries plural mounting lugs integrally joining with said one side wall;

wherein said plural mounting lugs each cantilevers from said one side wall;

further including an elongate web member extending transversely of said junction box, and said web member integrally joining with each of said plural mounting lugs on said one side wall.

24. The junction box of claim 23 wherein said web member has a pair of opposite ends, and said web member further joins integrally at each of its opposite ends with a side wall extending angularly to said one side wall.

25. A method of providing a non-conductive plastic junction box with conduit sockets which may be located on said junction box substantially anywhere a user chooses, said method comprising steps of:

providing the junction box with a non-perforate integral back wall having a periphery and at least one contiguous non-perforate integral side wall joining to the back wall at four contiguous side walls at said periphery thereof;

utilizing said back wall and said at least one contiguous side walls to cooperatively bound a chamber within said junction box;

providing and each of said at least one side walls with a terminating end edge substantially everywhere in a common plane, and employing said end edges to cooperatively define an opening to said chamber;

providing on said at least one contiguous side walls an integral mounting lug extending from one side of said opening toward but short of the opposite of said opening and from substantially said common plane toward but short of said back wall to terminate at a termination surface spaced from said back wall; and inwardly of said mounting lug termination surface, utilizing said one side wall to provide a wall portion extending from inwardly said termination surface of said mounting lug to said back wall, which wall portion is unobstructed and available for mounting of a conduit socket therein, whereby said junction box provides both increased interior volume and increased side wall area for the mounting of conduit sockets at holes formed therein by a user of the junction box.

26. An electrical junction box having plural walls cooperatively arranged and interconnected so as to substantially bound a volume and to define an opening to said volume by which electrical components and electrical wiring may pass into and from said volume; at least one wall of said plural walls of said junction box defining an insert recess opening outwardly from said volume, said insert recess having an outer portion of a larger size opening outwardly on said junction box and an inner portion of a smaller S1XS: opening inwardly to said volume, and said portions cooperatively defining both an outwardly disposed shoulder along said insert recess said a passage opening outwardly on said junction box as well as to said volume, whereby said insert recess may receive into said larger sized outer portion a matchingly configured insert member seating upon said shoulder and providing at least one conduit socket for receiving an end termination portion of at least one electrical conduit.

27. The junction box of claim 26 wherein said insert recess has a selected shape in axial view along said passage.

28. The junction box of claim 27 wherein said selected shape is selected from the group consisting of: rectangular, square, oval, semicircular, and bi-cameral.

29. The junction box of claim 28 wherein said selected shape is bi-cameral, and is symmetrical in axial view and includes a pair of semicircular recess portions arranged in mirror image to one another.

30. A method of providing an electrical junction box, said method comprising steps of:

providing plural walls for said junction box, and cooperatively arranging and interconnecting said plural walls so as to substantially bound a volume;

utilizing an end edge of selected ones of said plural walls to cooperatively define an opening to said volume by which electrical components and electrical wiring may pass into and from said volume;

utilizing at least one wall of said plural walls of said junction box to define an insert recess, and configuring said insert recess to open outwardly from said volume outwardly on said junction box and to providing a larger sized outer portion, and a smaller sized inner portion cooperating with said larger portion to define an outwardly disposed shoulder along said insert recess, whereby said insert recess may receive a matchingly configured insert member into said larger portion and seating upon said shoulder and defining a conduit socket providing for joining to said junction box of at least one electrical conduit.

31. The method of claim 30 further including the step of providing for said insert recess to have a selected shape in axial view of said insert recess.

32. The method of claim 31 including the step of selecting said selected shape from the group consisting of: rectangular, square, oval, semicircular, and bi-cameral.

33. The method of claim 32 including the step of choosing said selected shape to be bi-cameral, and configuring said bi-cameral shape to be symmetrical in axial view and to include a pair of semicircular recess portions arranged in mirror image to one another.

34. A unitary insert member for use in combination with an electrical junction box, said insert member including an axially extending cylindrical body portion of selected configuration in axial end view, and at least one boss member extending axially from said body portion, said body portion and said boss member cooperatively defining a stepped axial through bore with a larger diameter portion opening outwardly on said boss member and a smaller diameter portion and body portion opening on through said body portion and cooperating with said larger diameter portion to define a shoulder on said through bore disposed toward said larger diameter portion, said stepped through bore providing a socket for receiving into said larger diameter portion an end portion of an electrical conduit.

35. The insert member of claim 34 wherein said insert member provides a pair of boss members and a corresponding pair of conduit sockets in side by side relationship.

36. The insert member of claim 34 wherein said body portion has an axial center line in side elevation view, and said boss portion similarly has an axial center line in side elevation view, and the respective axial centerlines of said body portion and of said boss member are parallel to one another and are offset laterally of said center lines relative to one another.

37. An insert member for use in combination with a pair of electrical junction boxes each of which defines a respective one of a pair of outwardly opening insert recesses each of rectangular shape in axial view of said pair of insert recesses, said insert member providing for joining of said pair of electrical junction box to form a ganged pair of junction boxes, said insert member including a central body portion and a pair of rectangular boss members matching in size and shape with said pair of recesses and extending in opposite directions from said body portion, said body portion and said pair of boss members cooperatively defining a rectangular through passage opening outwardly on each of said pair of boss members and extending axially in said boss members, and body portion through said insert member, whereby each one of said pair of boss members is received into a respective insert recess of said pair of junction boxes to form a gauged pair of junction boxes and said rectangular through passage provides for passage of electrical wires between said gauged pair of junction boxes.

38. The insert member of claim 37 wherein said through passage is generally rectangular in axial view.

39. A conduit coupling defining a pair of oppositely extending conduit sockets each providing for adhesively receiving an end portion of a run of conduit, said conduit coupling further including an exterior boss providing a mounting surface extending parallel to the axis of the coupling, and provision for receiving and retaining a spacer member disposed between said exterior boss and a surface upon which said conduit coupling is attached.

40. The conduit coupling of claim 39 wherein said provision at said boss includes a pair of parallel mounting pins.

41. The conduit coupling of claim 40 wherein said pair of parallel mounting pins each define one or more clipping necks at which the length of the pins may be conveniently shortened by cutting or clipping.

42. The conduit coupling of claim 39 and further a tab member including a pair of holes spaced apart to match with and be received over the pair of mounting pins to rest upon the surface of the boss.

43. An electrical junction box having plural walls cooperatively arranged and interconnected so as to substantially bound a volume and to define an opening to said volume by which electrical components and electrical wiring may pass into and from said volume; a back one of said plural walls outwardly and at respective corners of the junction box defining respective ones of plural corner recesses, each corner recess including a recess floor bounded by a pair of recess side walls which intersect with the floor and with each other at substantially a right angle, and a locating member centrally located of each of said plural corner recesses and projecting upwardly in this recess perpendicularly to the back wall.

44. The electrical junction box of claim 43 wherein said locating member is configured as a pin member round in cross section, and providing for receipt into said corner recess of a mounting member in a selected one of plural alternative orientations.

45. An electrical junction box having plural walls cooperatively arranged and interconnected so as to substantially bound a volume and to define an opening to said volume by which electrical components and electrical wiring may pass into and from said volume: a back one of said plural walls outwardly and at respective corners of the junction box defining respective ones of plural corner recesses, each corner recess including a recess floor bounded by a pair of recess side walls which intersect with the floor and with each other at substantially a right angle, and a locating member centrally located of each of said plural corner recesses and projecting upwardly in this recess perpendicularly to the back wall;

wherein said locating member is configured as a pin member round in cross section, and providing for receipt into said corner recess of a mounting member in a selected one of plural alternative orientations;

wherein said mounting member includes an elongate tab member received into a corner recess and upon said mounting pin, said tab member defining a locating hole received over said mounting pin, and plural end edge surfaces disposed about said locating hole and which intersect at 45 degree angles to one another and to the length of said elongate mounting tab, whereby said mounting tab may be adhesively secured into said corner recess in any one of three alternative positions each disposed at 45 degrees to the other, and said mounting tab may extend outwardly of said junction box to provide for fastening of said junction box to underlying structure.

46. A mounting tabs providing for adhesive installation into a recesses of a junction box, said mounting tab being elongate and including three end edge surfaces each disposed at an effective angle of 45 degrees relative to the adjacent end edge surface.

47. A method of mounting an electrical junction box, said junction box having plural walls cooperatively arranged and interconnected so as to substantially bound a volume and to define an opening to said volume by which electrical components and electrical wiring may pass into and from said volume; said method including steps of:

providing at a back one of said plural walls of said junction box and at respective corners thereof respective ones of plural corner recesses, configuring each corner recess to include a recess floor bounded by a pair of recess side walls which intersect with the floor and with each other at substantially a right angle, and providing a locating member centrally located of each of said plural corner recesses and projecting upwardly in this recess perpendicularly to the back wall.

48. The method of claim 47 further including steps of configuring said locating member as a pin member round in cross section, and providing for receipt into said corner recess of a mounting member in a selected one of plural alternative orientations.

49. A method of mounting an electrical function box, said junction box having plural walls cooperatively arranged and interconnected so as to substantially bound a volume and to define an opening to said volume by which electrical components and electrical wiring may pass into and from said volume; said method including steps of:

providing at a back one of said plural walls of said junction box and at respective corners thereof respective ones of plural corner recesses, configuring each corner recess to include a recess floor bounded by a pair of recess side walls which intersect with the floor and with each other at substantially a right angle, and providing a locating member centrally located of each of said plural corner recesses and projecting upwardly in this recess perpendicularly to the back wall;

farther including steps of configuring said locating member as a pin member round in cross section, and providing for receipt into said corner recess of a mounting member in a selected one of plural alternative orientations;

further including steps of providing a mounting member configured as an elongate tab member which is received into a corner recess and upon said mounting pin, providing for said tab member to define a locating hole received over said mounting pin, and providing said tab member with plural end edge surfaces disposed about said locating hole and which intersect at 45 degree angles to one another and to the length of said elongate mounting tab, whereby said mounting tab may be adhesively secured into said corner recess in any one of three alternative positions each disposed at 45 degrees to the other, and said mounting tab extends outwardly of said junction box to provide for fastening of said junction box to underlying structure.

\* \* \* \* \*